(12) United States Patent
Abreu et al.

(10) Patent No.: US 9,990,734 B2
(45) Date of Patent: Jun. 5, 2018

(54) LOCATING AND AUGMENTING OBJECT FEATURES IN IMAGES

(71) Applicant: HOLITION LIMITED, London (GB)

(72) Inventors: Joe Abreu, London (GB); Maria Jose Garcia Sopo, London (GB)

(73) Assignee: HOLITION LIMITED, London (GB)

( * ) Notice: Subject to any disclaimer, the term of this patent is extended or adjusted under 35 U.S.C. 154(b) by 17 days.

(21) Appl. No.: 14/908,952

(22) PCT Filed: Jul. 25, 2014

(86) PCT No.: PCT/GB2014/052291
§ 371 (c)(1),
(2) Date: Jan. 29, 2016

(87) PCT Pub. No.: WO2015/015173
PCT Pub. Date: Feb. 5, 2015

(65) Prior Publication Data
US 2016/0196665 A1    Jul. 7, 2016

(30) Foreign Application Priority Data

Jul. 30, 2013  (GB) .................................. 1313620.5
May 23, 2014  (GB) .................................. 1409273.8
Jun. 13, 2014  (GB) .................................. 1410624.9

(51) Int. Cl.
*G06T 7/20*    (2017.01)
*G06K 9/62*    (2006.01)
(Continued)

(52) U.S. Cl.
CPC ........ *G06T 7/2046* (2013.01); *G06K 9/00281* (2013.01); *G06K 9/621* (2013.01);
(Continued)

(58) Field of Classification Search
CPC . G06T 2207/10016; G06T 2207/20081; G06T 2207/20221; G06T 2207/30201; G06T 7/2046; G06T 7/75; G06K 9/621
(Continued)

(56) References Cited

U.S. PATENT DOCUMENTS

2002/0130890 A1   9/2002  Karatassos et al.
2007/0019882 A1   1/2007  Tanaka et al.
(Continued)

FOREIGN PATENT DOCUMENTS

EP    1959394 A2    8/2008
EP    2178045 A1    4/2010
(Continued)

OTHER PUBLICATIONS

Jeon, Jiwoon, Victor Lavrenko, and Raghavan Manmatha. "Automatic image annotation and retrieval using cross-media relevance models." Proceedings of the 26th annual international ACM SIGIR conference on Research and development in informaion retrieval. pp. 119-126. ACM, 2003.*

(Continued)

*Primary Examiner* — Kimberly A Williams
(74) *Attorney, Agent, or Firm* — Morris & Kamlay LLP

(57) ABSTRACT

A computer-implemented method and system are described for augmenting image data of an object in an image, the method comprising receiving captured image data from a camera, storing a plurality of augmentation image data defining a respective plurality of augmentation values to be applied to the captured image data, storing a plurality of augmentation representations, each representation identifying a respective portion of augmentation image data, selecting one of said augmentation image data and one of said augmentation representations based on at least one colorization parameter, determining a portion of the augmentation (Continued)

image data to be applied based on the selected augmentation representation, augmenting the captured image data by applying said determined portion of the augmentation image data to the corresponding portion of the captured image data, and outputting the augmented captured image data.

24 Claims, 27 Drawing Sheets

(51) Int. Cl.
　　　*G06K 9/00*　　　(2006.01)
　　　*G06T 11/00*　　(2006.01)
　　　*G06T 7/73*　　　(2017.01)
　　　*G06T 7/246*　　(2017.01)
(52) U.S. Cl.
　　　CPC ............... *G06T 7/251* (2017.01); *G06T 7/75* (2017.01); *G06T 11/00* (2013.01); *G06T 2207/10016* (2013.01); *G06T 2207/20081* (2013.01); *G06T 2207/20221* (2013.01); *G06T 2207/30201* (2013.01)
(58) Field of Classification Search
　　　USPC ........................................................ 345/427
　　　See application file for complete search history.

(56) References Cited

U.S. PATENT DOCUMENTS

| | | | |
|---|---|---|---|
| 2010/0214288 A1 | 8/2010 | Xiao et al. | |
| 2012/0069018 A1* | 3/2012 | Yamaya | G06T 7/593 345/420 |
| 2012/0086783 A1* | 4/2012 | Sareen | G06N 3/006 348/47 |
| 2012/0308124 A1 | 12/2012 | Belhumeur et al. | |
| 2013/0169827 A1 | 7/2013 | Santos et al. | |
| 2016/0071287 A1* | 3/2016 | Lucey | G06T 7/2046 382/103 |

FOREIGN PATENT DOCUMENTS

| | | |
|---|---|---|
| EP | 2615577 A1 | 7/2013 |
| GB | 2488237 A | 8/2012 |
| WO | 2010042990 A1 | 4/2010 |

OTHER PUBLICATIONS

Sivic, Josef, et al. "Discovering object categories in image collections." (2005).*
UK Search Report dated Dec. 15, 2014 issued in Application No. GB1410624.9.
"Follow-the-Trial-Fitter: Real-time dressing without undressing", Third International Conference on Digital Information Management (ICDIM), Nov. 13, 2008, pp. 33-38.
Cootes, et al., "Active Appearances Models", IEEE Transactions on Pattern Analysis and Machine Intelligence, IEEE Computer Society, USA, vol. 23, No. 6, Jun. 1, 2001 (Jun. 1, 2001), pp. 681-685, XP001110809.
Cootes, et al., "An Introduction to Active Shape Models", Image Processing and Analysis, 2000, Jan. 1, 2000 (Jan. 1, 2000), pp. 223-248, XP055149027.
Dong, et al., "Digital face makeup by example", 2009 IEEE Conference on Computer Vision and Pattern Recognition : CVPR 2009 ; Miami [Beach], Florida, USA, Jun. 20-25, 2009, IEEE, Piscataway, NJ, Jun. 20, 2009 (Jun. 20, 2009), pp. 73-79, XP031607360.
Hauswiesner, et al., "Image-based Clothes Transfer", 10th IEEE International Symposium on Mixed and Augmented Reality (ISMAR), Oct. 26, 2011, Oct. 26, 2011, pp. 169-172.
Xiong, et al., "Supervised Descent Method and Its Applications to Face Alignment", IEEE Computer Society Conference on Computer Vision and Pattern Recognition. Proceedings, IEEE Computer Society, US, Jun. 23, 2013 (Jun. 23, 2013), pp. 532-539, XP032492802.
PCT Search Report and Written Opinion of the International Searching Authority dated Nov. 6, 2014 issued in PCT/GB2014/052291.

* cited by examiner

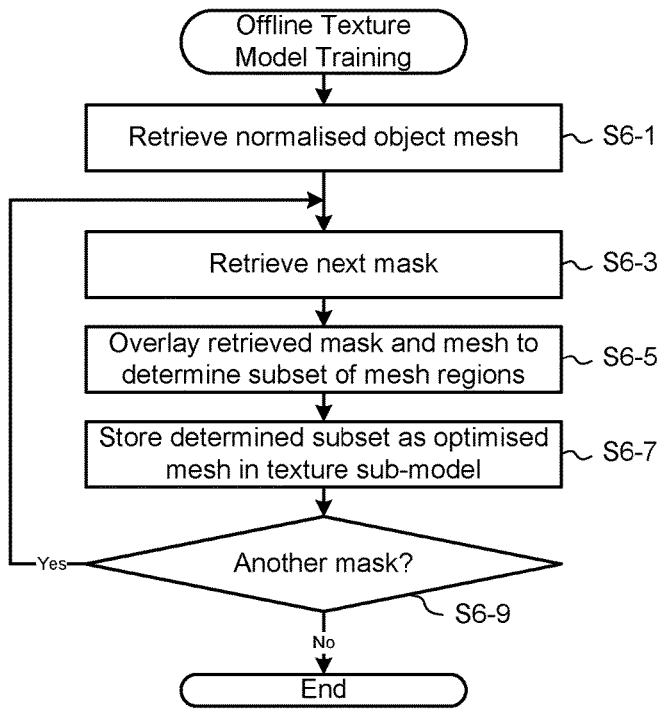
FIG. 6
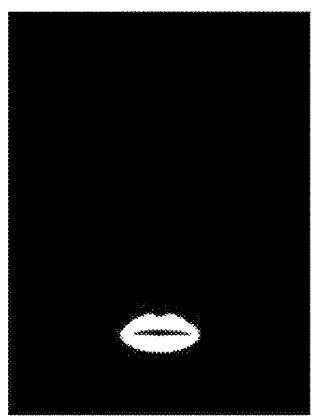 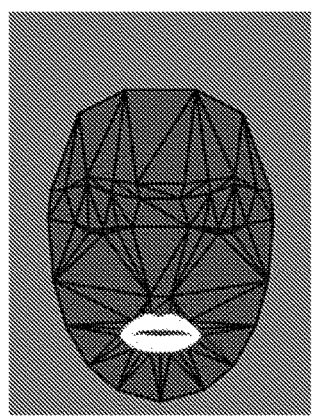 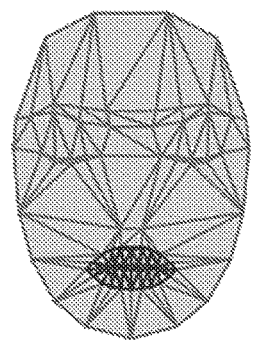
FIG. 7a  FIG. 7b  FIG. 7c

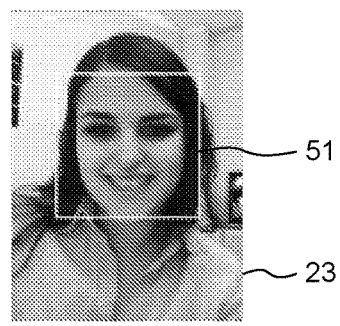
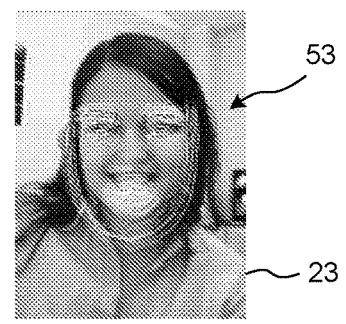
FIG. 12a            FIG. 12b
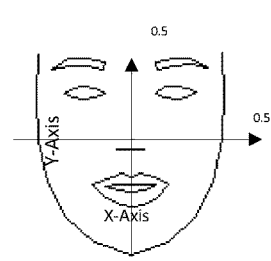
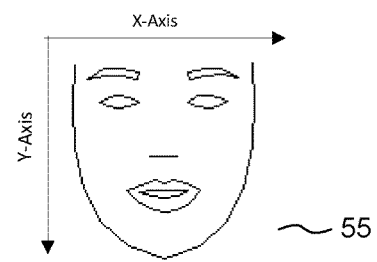
FIG. 12c            FIG. 12d

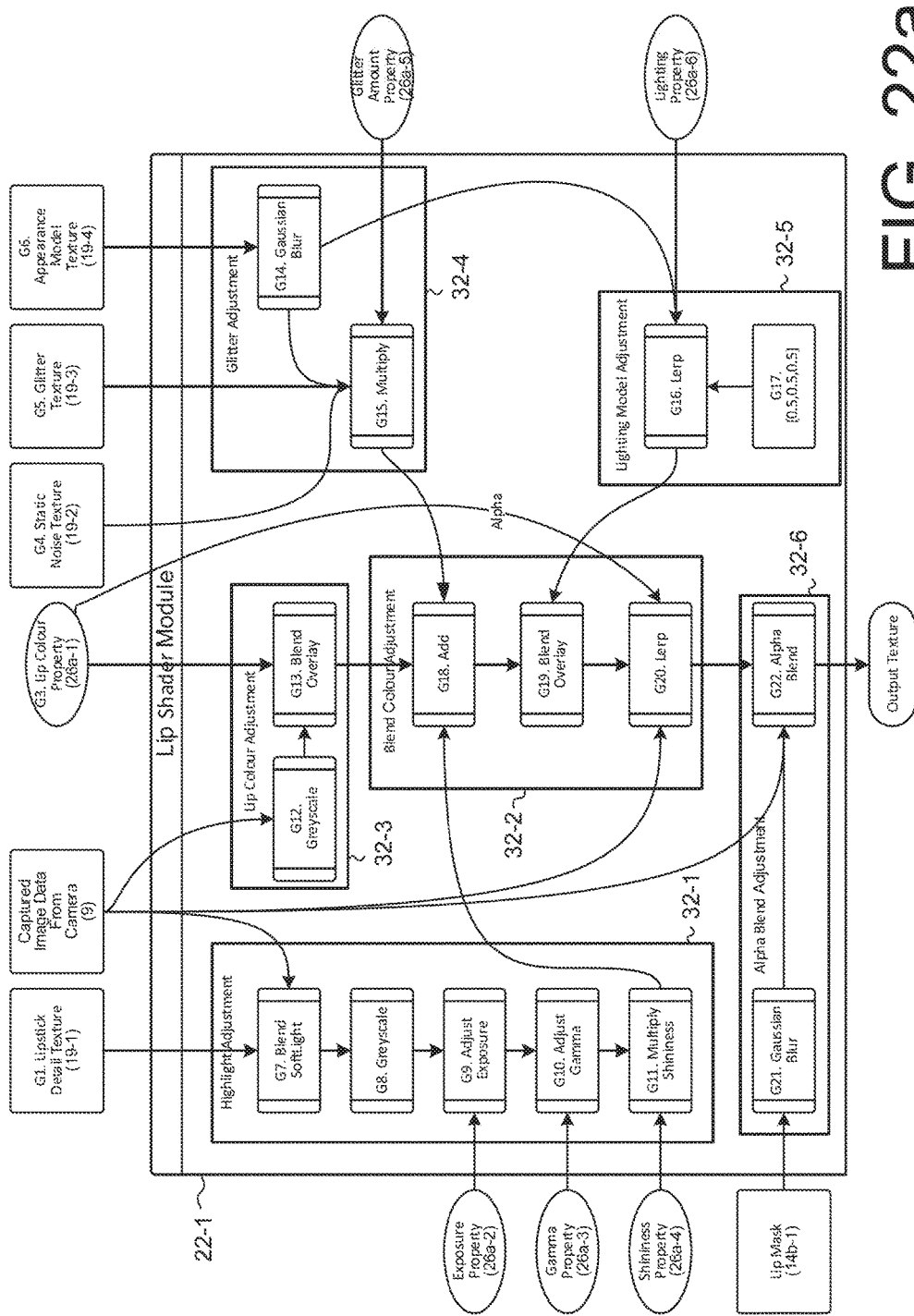

LOCATING AND AUGMENTING OBJECT FEATURES IN IMAGES

FIELD OF THE INVENTION

This invention relates to an image processing system, and more particularly to techniques for locating and augmenting object features in images.

BACKGROUND OF THE INVENTION

Choosing a new cosmetic product is often a tedious and time consuming process, and is only usually possible in a retail environment where samples are made available. An important consideration for a customer trying on any new product is seeing how it looks as they move around, taking momentary opportunity to view themselves wearing the cosmetic from particular angles or with particular expressions.

Utilising the mass availability of handheld, or other, computing devices to make real-time virtual try-on of new cosmetics possible in any environment has the potential to radically change the way the customer finds the perfect product. Three main challenges for any such system are first, locating and tracking the features of a subject in a live captured image data stream, second, augmenting a virtual cosmetic product realistically in place over the live images, and finally to do all this in real-time, particularly on devices having limited hardware capabilities.

Feature tracking systems are generally known, in which tracking of an identified person or object in a captured scene is performed based on established image processing techniques. For example, one well known technique for object shape modelling is Active Shape Modelling (ASM), as discussed for example in "Lip Reading Using Shape, Shading And Scale", Mathews, Cootes, Cox, Harvey and Bangham, and "An Introduction To Active Shape Models", Tim Cootes. Another well known technique for object appearance modeling is Active Appearance Modelling (AAM), as discussed for example, in "Active Appearance Models", Cootes, Edwards and Taylor.

However, conventional feature tracking systems are not efficient and typically require significant computational overheads, for example for off-line training of object models and subsequent live tracking of objects based on the trained models. Moreover, techniques such as AAM perform well on conventional per-person models but are slow, not robust enough and unable to generalize for data not included in the training set.

What is desired are improved techniques for feature tracking and augmenting that address these challenges.

STATEMENTS OF THE INVENTION

Aspects of the present invention are set out in the accompanying claims.

In one aspect, the present invention provides a computer-implemented method of augmenting image data, the method comprising receiving data of an image captured by a camera; receiving data identifying coordinates of a plurality of labelled feature points defining a detected object in the captured image; storing at least one augmentation image data defining a plurality of augmentation values to be applied to the captured image data; storing at least one augmentation representation including data defining at least one polygonal region of the augmentation image data, the or each polygonal region defined by three or more vertices, each vertex associated with a corresponding labelled feature point; determining a transformation of the at least one polygonal region of the representation based on the received coordinates of the corresponding feature points; applying the determined transformation to corresponding regions of the augmentation image data defined by the at least one polygonal regions of the augmentation representation; and augmenting the captured image data by applying the transformed at least one portion of the augmentation image data to the corresponding portion of the captured image data.

The augmentation image data may comprise one or more of texture image data, data identifying one or more material properties, and a mathematical model to generate an array of augmentation values. The augmentation image data and the captured image data may have the same dimensions or different dimensions.

Coordinates of the vertices of the augmentation representation may be defined relative to pixel locations of the augmentation image data. Augmenting the captured image data may further comprise applying at least one image data adjustment to the transformed at least one portion of the augmentation image data. The at least one image data adjustment may comprise one or more of a highlight adjustment, a colour adjustment, a glitter adjustment, a lighting model adjustment, a blend colour adjustment, and an alpha blend adjustment.

Mask data may be stored defining at least one masked portion of the augmentation image data. The determined transformation may be applied to corresponding regions of the mask data defined by the at least one polygonal regions of the augmentation representation. The at least one image data adjustment may comprise alpha blending said transformed masked data regions.

A stored augmentation image data and a stored augmentation representation may be selected based on at least one colourisation parameter. A plurality of stored augmentation image data and stored augmentation representations may be selected based on respective at least one colourisation parameters.

Augmenting the captured image data may comprise alpha blending the results of applying, for each selected augmentation representation in sequence, transformed at least one portions of each selected augmentation image data to the corresponding portion of the captured image data, and applying the alpha blended output to the captured image data.

According to another aspect, the present invention provides a computer-implemented method of generating the above augmentation representations, based on respective predefined mask data identifying coordinates of a plurality of masked pixels.

An augmentation representation may be generated by retrieving data defining a plurality of polygonal regions determined for the detected object, placing the retrieved plurality of polygonal regions over the respective mask data, identifying polygonal regions that include at least one masked pixel, and storing data representing the identified subset of polygonal regions. Each masked pixel may comprise a value representing a blend parameter.

The detected object in the captured image may be located by storing a representation of the object, the representation including data defining a first object model and a corresponding function that approximates variations to the first object model, and data defining at least one second object model comprising a subset of the data defining the first object model, and at least one corresponding function that approximates variations to the respective second object model; determining an approximate location of the object in the captured image, based on the first object model and its corresponding function; and refining the location of the object in the captured image by determining a location of a portion of the object, based on the at least one second object model and its corresponding function.

The first object model may comprise data representing locations of a plurality of feature points and the second object model comprises a subset of the feature points of the first object model. The first object model may define a shape of the whole object and the at least one second object model may define a shape of a portion of the object.

Determining the approximate location of the object in the image may comprise generating a candidate object shape based on the first object model and applying the corresponding function to determine an approximate location of the candidate object shape.

The candidate object may be split into one or more candidate object sub-shapes based on the at least one second object models. The location of the one or more candidate object sub-shapes may be refined based on the respective second object model and its corresponding function.

The corresponding functions may comprise regression coefficient matrices. The corresponding function that approximates variations to the second object model may comprise a plurality of cascading regression coefficient matrices. The location of the one or more candidate object sub-shapes may be iteratively refined based on the respective second object model and its corresponding plurality of cascading regression coefficient matrices.

According to yet another aspect, the present invention provides a computer-implemented method of augmenting image data, the method comprising receiving captured image data from a camera; storing a plurality of augmentation image data defining a respective plurality of augmentation values to be applied to the captured image data; storing a plurality of augmentation representations, each representation identifying a respective portion of augmentation image data; selecting one of said augmentation image data and one of said augmentation representations based on at least one colourisation parameter; determining a portion of the augmentation image data to be applied based on the selected augmentation representation; augmenting the captured image data by applying said determined portion of the augmentation image data to the corresponding portion of the captured image data; and outputting the augmented captured image data.

In one exemplary aspect, there is provided a computer-implemented method of locating an object in an image, the method comprising storing a representation of the object, the representation including data defining a first object model and a corresponding function that approximates variations to the first object model, and data defining at least one second object model comprising a subset of the data defining the first object model, and a corresponding function that approximates variations to the second object model; determining an approximate location of the object in the image, based on the first object model and its corresponding function; and refining the location of the object in the image by determining a location of a portion of the object, based on the second object model and its corresponding function.

The first object model may comprises data representing locations of a plurality of feature points and the second object model may comprise a subset of the feature points of the first object model. A region of an image that contains the object may be identified, wherein the approximate location of the object is determined within the identified region of the image.

The first object model may define a shape of the whole object and the at least one second object model may define a shape of a portion of the object. The approximate location of the object in the image may be determined by generating a candidate object shape based on the first object model and applying the corresponding function to determine an approximate location of the candidate object shape.

The candidate object may be split into one or more candidate object sub-shapes based on the at least one second object models. The location of the one or more candidate object sub-shapes may be refined based on the respective second object model and its corresponding function. The representation of the object may further comprise data defining computed mean and standard deviation statistics associated with position and scale of the first object model. The image may be transformed based on the computed statistics.

The location of a candidate object sub-shape may be refined by determining an object feature descriptor for the candidate object sub-shape based on the transformed image. The corresponding functions may comprise regression coefficient matrices. Exponential smoothing may be applied to the refined location of the object based on a prior location of the object determined from a previous image.

In another exemplary aspect, there is provided a computer-implemented method of generating the representation of an object based on a plurality of training images with corresponding data defining the location of the object therein, the representation including data defining a first object model and a corresponding function that approximates variations to the first object model, and data defining at least one second object model comprising a subset of the data defining the first object model, and a corresponding function that approximates variations to the second object model.

In a further exemplary aspect, there is provided a computer-implemented method of augmenting image data, the method comprising receiving data of an image captured by a camera, the captured image including a facial feature portion corresponding to at least one feature of a user's face; processing the captured image data to determine a subset of pixels of the received image data associated with the detected facial feature portion; calculating replacement pixel data values for the determined subset of pixels of the received image data, based on at least one selected augmentation parameter; and outputting data of an augmented version of the captured image, including the calculated replacement pixel data for the determined subset of pixels.

User input may be received identifying at least one selected facial feature. The selected facial feature may be the user's lips. A representation of the lips may be stored, the representation including data defining a model of the lips and a corresponding function that approximates variations to the model, and an approximate location of the lips may be determined in the captured image based on the model and its corresponding function. The location of the lips in the captured image may be iteratively refined.

The approximate location of the lips may be defined by coordinates of a plurality of labelled feature points, and the augmentation process may further include: storing augmentation image data defining augmentation values to be applied to a portion of the captured image data; determining a transformation of the augmentation image data based on the determined coordinates of the corresponding feature points;

and augmenting the captured image data by applying the transformed augmentation image data to the corresponding portion of the captured image data.

In yet another exemplary aspect, there is provided an image processing method comprising detecting an area of an input image corresponding to a user's face; detecting an area of the input image corresponding to one or more facial features of a user; populating a foreground colour histogram with the frequency of occurrence of colour values in the detected facial feature area and populating a background colour histogram with the frequency of occurrence of colour values within the detected face area but outside of the detected facial feature area; generating a probability map based on a determination, from the colour values of pixels within the input image, of likelihood values representing the likelihood of pixels belonging to an image area of interest, the likelihood value for each colour value being determined from a combination of the foreground and background histograms; mapping foreground pixels having a likelihood value above a predetermined threshold to positions with a colour space, and determining a foreground colour cluster centre within the colour space for the mapped foreground pixels; mapping background pixels having a likelihood value below the predetermined threshold to positions within the colour space, and determining a background colour cluster centre for the mapped background pixels; reallocating mapped pixels between the foreground and background colour clusters based on relative proximity to the foreground and background colour cluster centres; updating the foreground and background histograms using the reallocated pixels; generating an updated probability map for an input image to be augmented based on a determination, from the colour values of pixels within the input image to be augmented, of likelihood values representing the likelihood of pixels belonging to an image area of interest, the likelihood value for each colour value being determined from a combination of the updated foreground and background histograms; and modifying the input image to be augmented to change the appearance of the user's facial features.

In a further exemplary aspect, there is provided an image processing method, comprising the steps of identifying an area of an input image corresponding to one or more facial features of a user; and generating replacement colour values for pixels within the identified area of the image based on a combination of a highlight adjustment process and a glitter adjustment process.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

FIG. 6 is a flow diagram illustrating the main processing steps performed by the texture model training module of FIGS. 1 and 2 according to an embodiment.

FIG. 8 is a flow diagram illustrating the main processing steps performed by the shape model training module of FIGS. 1 and 2 according to an embodiment.

FIG. 12, which comprises FIGS. 12a to 12e, show further examples of the processing steps performed by the shape model training module of FIG. 2.

FIGS. 18a to 18e, shows an exemplary sequence of display screens during the tracking process of FIG. 15.

FIG. 22, which comprises FIGS. 22a to 22d, are schematic block flow diagrams illustrating the main components and processing flows for exemplary shader shader modules in the colourisation module.

DETAILED DESCRIPTION OF EMBODIMENTS OF THE INVENTION

Overview

Specific embodiments of the invention will now be described for a process of training object shape and texture models, a process of tracking detected objects based on trained object shape models, and a process of augmenting image data of the tracked objects based on trained object texture models. It will be appreciated that although the respective processes and associated processing modules are described as separate embodiments, aspects of the described embodiments can be combined to form further embodiments. For example, alternative embodiments may comprise one or more of the texture training, shape training, object tracking, and object colourisation and augmentation aspects described in the embodiments below.

Figure 1:
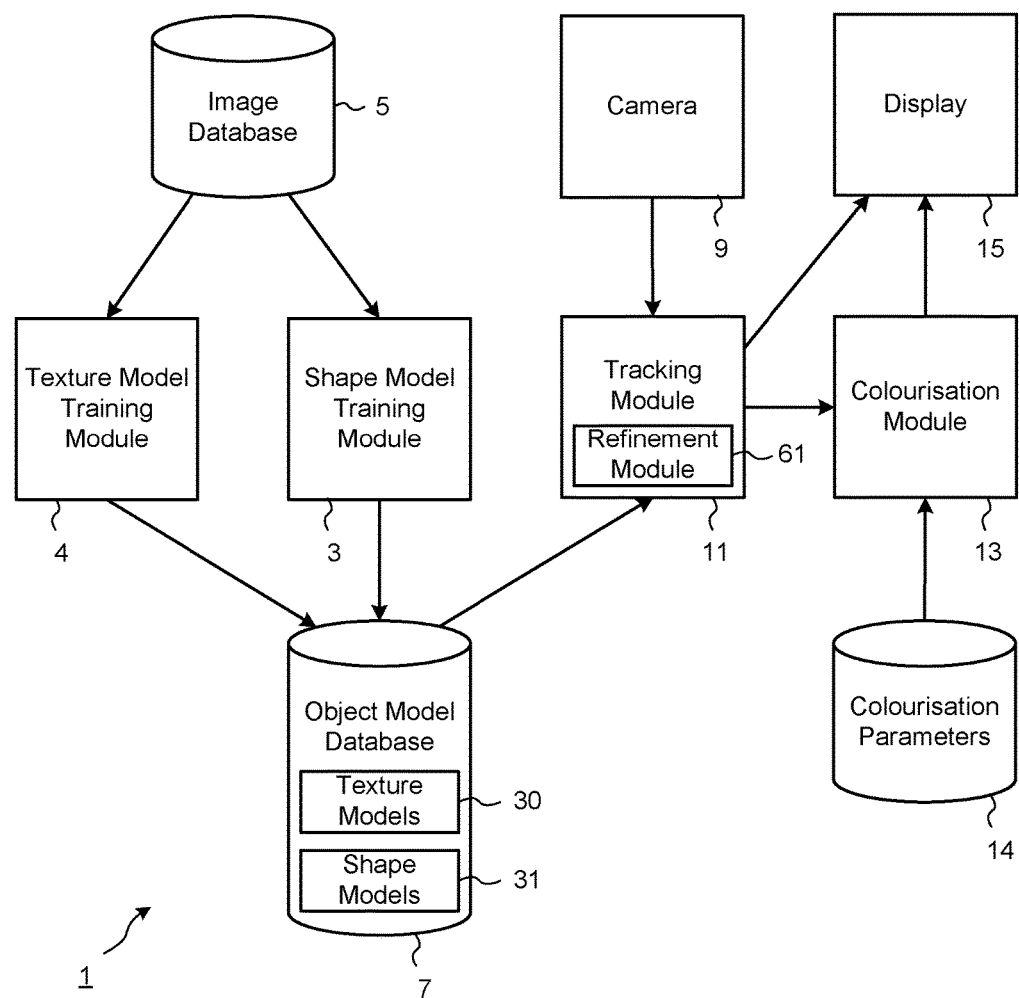
FIG. 1 is a block diagram showing the main components of a feature tracking and colourisation system according to an embodiment of the invention.

Referring to FIG. 1, a tracking and augmenting system 1 according to an embodiment comprises a texture model training module 4 for processing a representative image in an image database 5 to generate and store trained texture models 30, as will be described in detail below. A shape model training module 3 may also be provided for processing training images in the image database 5 to generate and store trained shape models for use during real-time processing of input image data from a camera 9 by a tracking module 11. The processing of image data by the shape model training module 3 and texture model training module 4 may be referred to as "offline" pre-processing, as the training processes are typically carried out in advance of the "real-time" image processing by the tracking module 11. The tracking module 11 receives image data captured by the camera 9 and determines the location of an identified object in the image, defined by a plurality of labelled feature points. Image data of the tracked object is then augmented by a colourisation module 13, based on colourisation parameters 14, and output to a display 15.

The system 1 may be implemented by any suitable computing device of a type that is known per se, such as a desktop computer, laptop computer, a tablet computer, a smartphone such as an iOS™, Blackberry™ or Android™ based smartphone, a 'feature' phone, a personal digital assistant (PDA), or any processor-powered device with suitable user input, camera and display means. Additionally or alternatively, the display 15 can include an external computing device, such as a mobile phone, tablet PC, laptop, etc. in communication with a host device for example via a data network (not shown), for example a terrestrial cellular network such as a 2G, 3G or 4G network, a private or public wireless network such as a WiFi™-based network and/or a mobile satellite network or the Internet.

Texture Model Training Module

The texture model training module 4 in the tracking and augmenting system 1 of the present embodiment will now be described in more detail with reference to FIG. 2, which shows the main elements of the texture model module 4 as well as the data elements that are processed and generated by the texture model module 4 for the trained texture models 30. Reference is also made to FIGS. 3a to 3d schematically illustrating examples of data that are processed and generated by the texture model training module 4 during the training process.

Figure 2:
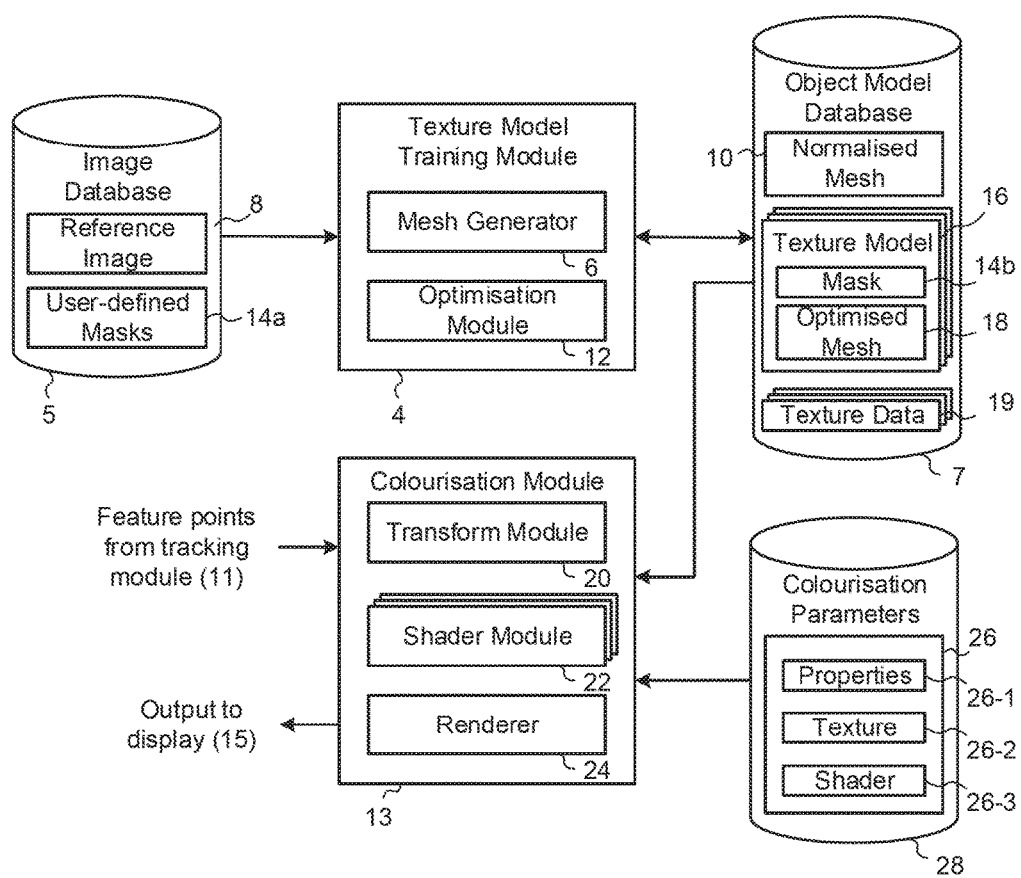
FIG. 2 is a block diagram showing the main components of the texture model training module and colourisation module shown in FIG. 1 and the components of a trained texture model according to an embodiment of the invention.
Figure 3A:
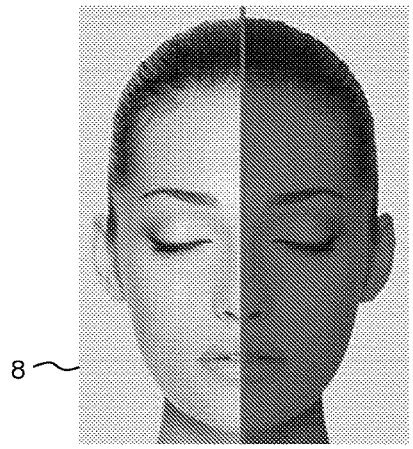
FIG. 3, which comprises FIGS. 3a to 3d, schematically illustrate examples of data processed and generated by the texture model training module during the training process.
Figure 3B:
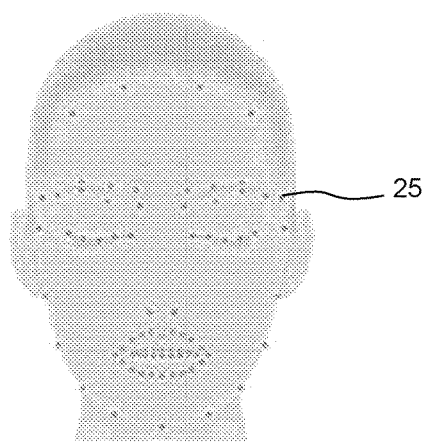

As shown in FIG. 2, the texture model training module 4 may include a mesh generator 6 that retrieves at least one reference image 8 from the training image database 5, for example as shown in FIG. 3a, and generates data defining a plurality of polygonal regions based on the retrieved reference image 8, collectively referred to as a normalised mesh 10. Each region is defined by at least three labelled feature points and represents a polygonal face of the two-dimensional normalised mesh 10. It is appreciated that the normalised mesh may instead define three-dimensional polygonal regions. The texture model training module 4 uses the same set of labelled feature points as the tracking module 11, so that vertex and texture coordinate data can be shared across a common reference plane. In one example, the mesh generator 6 is configured to receive data defining the location of labelled feature points in the or each reference image 8 as determined by the tracking module 11. In another example, the mesh generator 6 may prompt a user to input the location of each feature point for the or each reference image 8. FIG. 3b schematically illustrates a plurality of defined feature points overlaid on a representation of a reference image 8. Preferably, the reference image is a symmetrical reference face, in order to optimize texture space across all areas of the face where virtual makeup may be applied.

Figure 3C:
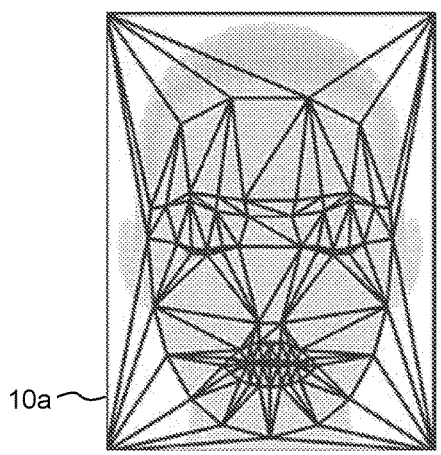
Figure 3D:
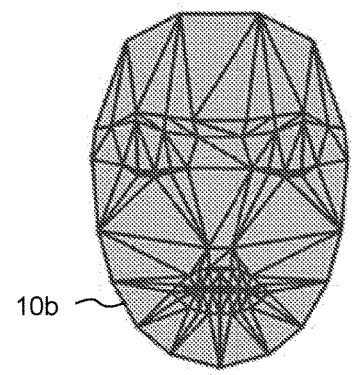

The texture model training module 4 may be configured to subsequently perform triangulation to generate a mesh of triangular regions based on the labelled feature points. Various triangulation techniques are known, such as Delaunay triangulation, and need not be described further. FIG. 3c schematically illustrates an example of a resulting normalised mesh 10a generated from the reference image shown in FIG. 6a and the plurality of labelled feature points shown in FIG. 6b. Optionally, the mesh generator 6 may further prompt the user for input to optimize the normalised mesh 10a, for example by reducing or increasing the number of triangles for a particular region of the reference image. FIG. 6d schematically illustrates an example of a resulting optimised version 10b of the normalised mesh 10a shown in FIG. 6c. Alternatively, the mesh generator 6 may be configured to facilitate manual triangulation from the labelled featured points to generate an optimal normalised mesh 10. It will be appreciated that in the context of the present embodiment, an optimal normalised mesh 10 consists of triangles that stretch in their optimum directions causing the least number of artefacts, resulting in a mesh that defines an ideal number of vertices and polygonal faces to be used for the application of virtual makeup as described below.

In the present embodiment, the normalised mesh 10 includes a first data array consisting of an indexed listing of the labelled feature points defined by x and y coordinates relative to a common two dimensional reference plane, such as the pixel locations of the texture image data 19, and a second data array consisting of a listing of polygon faces defined by indices of three or more labelled feature points in the first data array. For example, the first data array be an indexed listing of m vertices: $[x_0, y_0, x_1, y_1, x_m, y_m]$, each index corresponding to a different labelled feature point. The second data array may be listing of n exemplary polygon faces: $[1/2/20, 1/21/5, \ldots, 92/85/86]$, each polygon face defined by indices or three vertices in the first data array. The normalised mesh 10 data can be stored in an object model database 7 of the system 1. It is appreciated that the normalised mesh 10 may be defined at a different scale from the texture image data 19, and an additional processing step can be used to compute the necessary transformation.

The texture model training module 4 also includes an optimisation module 12 that generates a plurality of optimised texture models 14, based on the normalised mesh 10 retrieved from the object model database 7 and data defining one or more user-defined masks 16a, retrieved from the image database 5 for example. Each texture model 16 generated by the optimisation module 12 includes data defining the associated mask 14b such as a copy of or pointer to the image data defining the respective user-defined mask 14a, and an optimised mesh 18 comprising a subset of the polygonal regions of the normalised mesh 10 that is determined based on the associated mask 16b, as will be described in more detail below. In this way, the optimisation module 12 can be used to take a given makeup mask and output only the necessary polygonal faces that are to be used by the colourisation module 13 to render the respective portions of the augmented image data.

Many masks can be compounded together to produce a particular desired virtual look or appearance, which consists of multiple layers of virtually applied makeup, including for example one or more of lipstick, blusher, eye shadow and foundation, in multiple application styles. The masks 16 may include black and white pixel data. Preferably, the masks 16 are grey-scale image data, for example including black pixels defining portions of a corresponding texture data file 19 that are not to be included in the colourisation process, white pixels defining portions of the corresponding texture data file 19 that are to be included at 100% intensity, and grey pixels defining portions of the corresponding texture data file 19 that are to be included at an intensity defined by the associated grey value. The white and grey pixels are referred to as the masked data regions. In this way, different masks 16 can be provided for various blurring effects.

The texture data 19 may include texture image data, data identifying one or more associated material properties. Additionally or alternatively, the texture data 19 may include a mathematical model that can be used to generate an array of augmentation values to be applied by the colourisation module 13 to the captured image data. The texture image data 19 may have the same dimensions as the captured image data received from the camera. Alternatively, where the texture image data 19 has different dimensions from the captured image data, such as defining details of a portion of the overall face, meta data can be provided to identify the location of the texture portion relative to the pixel location of a captured image and/or reference image 8.

Colourisation Module

The colourisation module 13 in the tracking and augmenting system 1 of the present embodiment will now be described in more detail, again with reference to FIG. 2 also showing the main elements of the colourisation module 13 as well as the data elements that are processed by the colourisation module 13 to generate augmented image data that is output to the display 15. In this embodiment, a plurality of texture data files 19 are also stored in the object model database 7, defining image data of respective associated image augmentation that can be applied to the captured image data by the colourisation module 13.

As shown, the colourisation module 13 includes a plurality of shader modules 22 that determine and apply image colourisation to selected regions of texture data files 19. For example, four custom virtual makeup shader modules 22 can be implemented by the colourisation module 13, each having a respective predefined identifier, and used to determine and apply image colourisation to represent virtual application of lipstick, blusher, eye shadow and foundation to the captured image data. The output of a custom makeup shader module 22 is sent to a renderer 24 that augments the underlying user's face in the captured image from the camera 9 with the specified virtual makeup. As will be described in more detail below, each shader module 22 can be based on predefined sets of sub-shader modules to be applied in sequence, for example based on selected sets of colourisation parameters 26.

As shown in FIG. 2, predefined sets of colourisation parameters 26 can be stored in a colourisation parameters database 28, each set 26 including one or more predefined property values 26-1, predefined texture values 26-2 such as respective identifiers of a stored texture model 16 and a stored texture data file 19, and a predefined shader type 26-3 such as an identifier of a shader module 22 implemented by the colourisation module 13. The colourisation parameters database 24 may be a database of beauty product details, for example, whereby each product or group of products is associated with a respective set of colourisation parameters 26. Alternatively, the database 24 may include colourisation parameters 26 derived from product details retrieved from such a product database.

The colourisation module 13 also includes a transform module 20 that receives data defining the location of labelled features points in the common reference plane, determined by the tracking module 11 for a captured image. The determined coordinates from the camera image data define the positions of the polygonal regions of the normalised mesh 10 that match the detected object, the user's face in this embodiment. The transform module 20 determines a mapping from the vertices of a selected region of an optimised mesh 18 to vertices of the corresponding tracked labelled feature points. The transform module 20 uses the determined mapping to transform the associated regions of mask data 14b and texture data 19 retrieved from the object model database 7 for the particular set of colourisation parameters 26, into respective "warped" versions that are processed by the shader modules 22.

After all of the regions and colourisation parameters are processed by the transform module 20 and defined shader modules 22, the renderer 24 overlays the selected optimised meshes 18 according to the common reference plane, and in conjunction with an alpha blended shader sub-module (not shown), performs an alpha blend of the respective layers of associated regions of warped texture data. The blended result is an optimized view of what will get augmented on the user's face. The final result is obtained by the renderer 24 applying the blended result back onto the user's face represented by the captured image data from the camera 9, and output to the display 15.

In this way, the colourisation module 13 uses the image data coordinates from the reference face, referenced by the optimised meshes 18, as texture coordinates to the texture data files 19, for each texture model 16 associated with a respective set of colourisation parameters 26 for a selected virtual makeup product, transformed according to the tracked feature point locations, and rendered over the captured image data, resulting in the visual effect of morphing all of the selected virtual makeup products to the user's face in a real-time augmented reality display. It will be appreciated that the transform module 20, shader modules 22 and renderer 24 will include calls to a set of predefined functions provided by a Graphics Processing Unit (GPU) of the system 1. Advantageously, the present embodiment provides for more efficient GPU usage, as only the portions of the respective texture data files and captured image data are transmitted to the GPU for processing.

Shape Model Training Module

Figure 4:
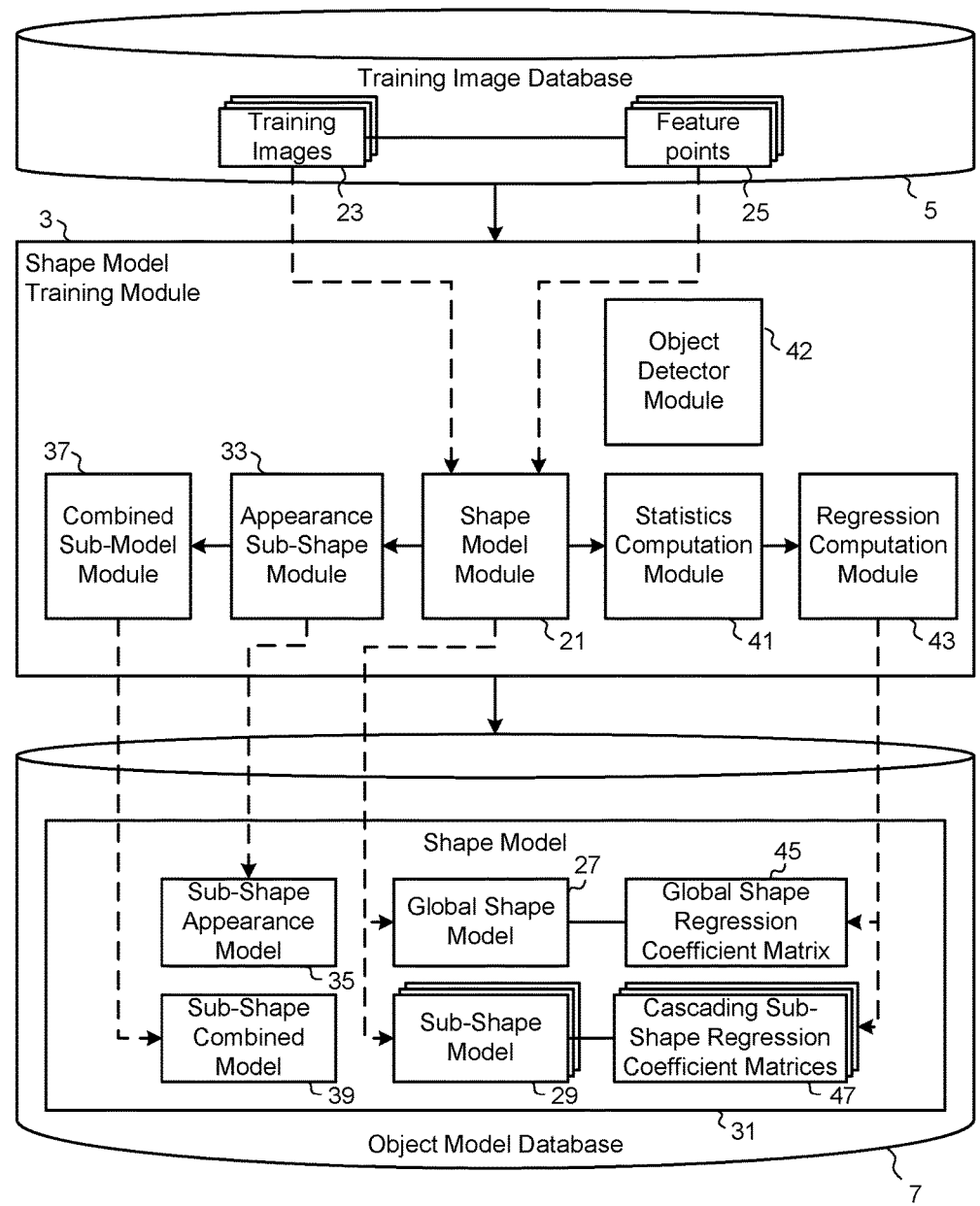
FIG. 4 is a block diagram showing the main components of the shape model training module shown in FIG. 1 and the components of a trained shape model according to an embodiment of the invention.

An exemplary shape model training module 3 in the tracking and augmenting system 1 will now be described in more detail with reference to FIG. 4, which shows the main elements of the shape training module 3 as well as the data elements processed and generated by the shape training module 3 for the trained shape models 31. As shown, the shape model training module 3 includes a shape model module 21 that retrieves training images 23 and corresponding user-defined feature points 25 from the training image database 5. The shape model module 21 generates and stores a global shape model 27 and a plurality of sub-shape models 29 for a trained object model 31 in the object model database 7, as will be described in more detail below. It will be appreciated that a plurality of trained object models may be generated and stored in the object model database 5, for example associated with respective different types of objects.

Figure 5:
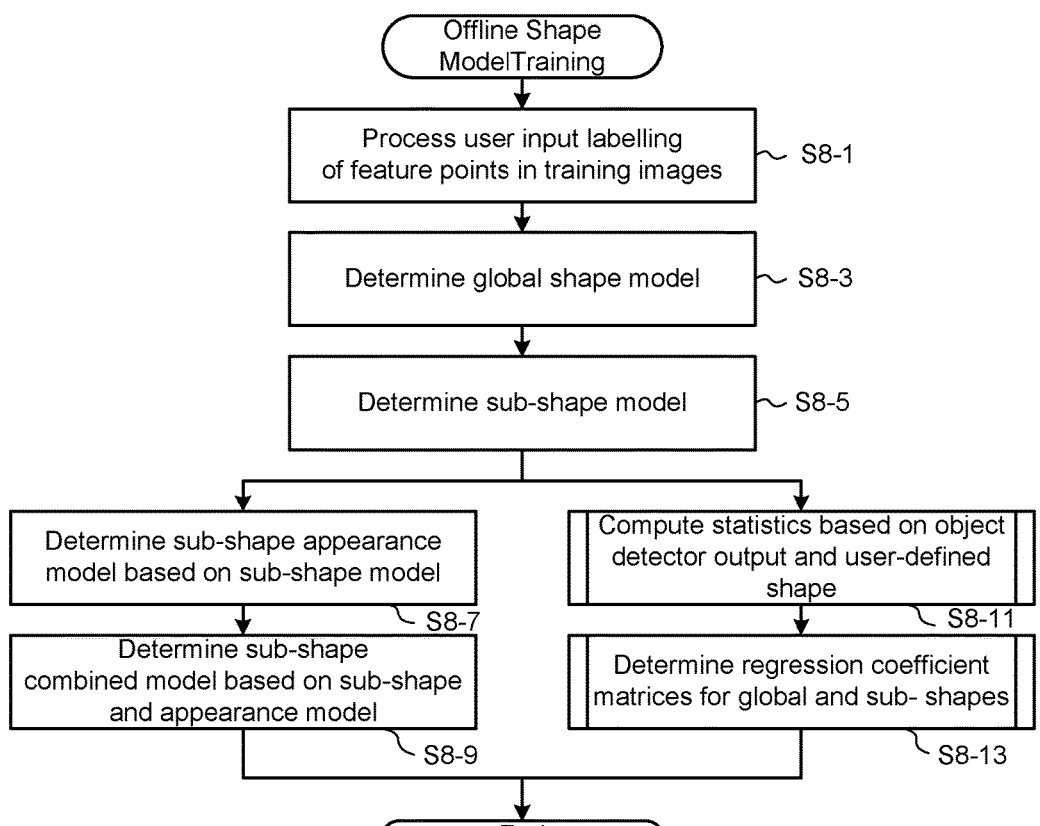
FIG. 5 is a schematic illustration of an exemplary trained model including a global shape and a plurality of sub-shapes.

FIG. 5 is a schematic illustration of an exemplary trained shape model including a global shape 27 and a plurality of sub-shapes 29. As shown, the exemplary data structure of shape model is an array of (x,y) coordinates, each coordinate associated with a respective feature point of the global shape 27, corresponding to respective labelled feature point 25 in the training data. Each sub-shape models 29 may be associated with a respective subset of the (x,y) coordinates, each subset thereby defining a plurality of feature points 25 of the respective sub-shape. The subsets of feature points 25 for each sub-shape may overlap In this exemplary embodiment, the image database 5 stores a plurality of training images 23, each training image 23 comprising the entire face of a subject, including one or more facial features such as a mouth, eye or eyes, eyebrows, nose, chin, etc. For example, the training images 23 may include subject faces and facial features in different orientations and variations, such as front-on, slightly to one side, closed, pressed, open slightly, open wide, etc.

The shape model training module 3 may include an appearance sub-shape module 33 that can be used to generate sub-shape appearance models 35 for one or more of the sub-shape models 29, for example based on pre-defined sub-shape detailed textures. The sub-shape detail textures may be pre-prepared grey scale textures, for example for the lip, cheek and eyes of a subject face. Different textures may be used to implement different appearance finishes, for example glossy, matt, shiny etc. The process of generating a sub-shape appearance model structure can involve warping (through piecewise affine transformations) an image representing the sub-shape detailed texture to the mean shape specified by the corresponding sub-shape model 29. A combined sub-model module 37 can be provided to generate a sub-shape combined model 39 from a sub-shape model 29 and a corresponding sub-shape appearance model 35.

In this embodiment, the shape model training module 3 also includes a statistics computation module 41 that computes and stores mean and standard deviation statistics based on the plurality of global shape models 27 of the trained models 31 generated by the shape model module 21 and the output of the object detector module 42. The computed statistics can advantageously provide for more robust, accurate and efficient initial positioning of an object that is to be located within the bounding box output by an object detector module 42. In the present exemplary embodiment, object detector module 42 can implement any known face detector algorithm.

A regression computation module 43 of the shape model training module 3 generates a global shape regression coefficient matrix 45 based on the global shape 27 generated by the shape model module 21, and at least one sub-shape regression coefficient matrix 47 for each sub-shape 29 generated by the shape model module 21. As is known in the art, the regression coefficient matrices 45, 47 define an approximation of a trained function that can be applied, for example during a tracking phase, to bring the features of a candidate object shape from respective estimated locations to determined "real" positions in an input image. The generation of regression coefficient matrices 45, 47 in the training process therefore define respective trained functions which relate the texture around an estimated shape and the displacement between their estimated positions and the final position where the shape features are truly located. The regression computation module 43 can be configured to compute the respective regression coefficient matrices 45, 47 based on any known regression analysis technique, such as principal component regression (PCR), linear regression, least squares, etc. The plurality of regression coefficient matrices 45, 47 form parts of the trained model 31 stored in the object model database 7.

Texture Model Training Process

A brief description has been given above of the components forming part of the texture model training module 4 of one embodiment. A more detailed description of the operation of these components in this embodiment will now be given with reference to the flow diagram of FIG. 6, for an example computer-implemented training process using the texture model training module 4. Reference is also made to FIGS. 7a to 7c schematically illustrating examples of data that is processed and generated by the texture model training module 4 during the training process.

As shown in FIG. 6, the training process begins at step S6-1 where the texture model training module 4 retrieves a normalized object mesh 10 from the object model database 7. At step S6-3, the model training module 4 retrieves a first one of the plurality of user-defined masks 14a from the image database 5. FIG. 7a shows an example of a mask 14a defining a lip region of the reference image 8 shown in FIG. 3a. At step S5-5, the model training module 4 overlays the retrieved mask 14a on the retrieved normalised object mesh 10 to determine a subset of regions of the normalised mesh 10 that include at least a portion of the masked data regions. FIG. 7b schematically illustrates an example of the masked regions shown in FIG. 7a, overlaid on the normalised mesh 10 shown in FIG. 3d. FIG. 7c schematically illustrates the subset of mesh regions as determined by the texture model training module 4. At step S5-7, the determined subset of mesh regions is stored as an optimised mesh 18 in a texture model 16 for the associated mask 14b, in the object model database 7. At step S5-9, the model training module 4 determines if there is another mask 14a in the image database 5 to be processed, and if so, processing returns to step S5-3 where the next mask 14a is retrieved for processing as described above, until all of the user-defined masks 14a have been processed in this way.

Shape Model Training Process

Figures 9, 10A:
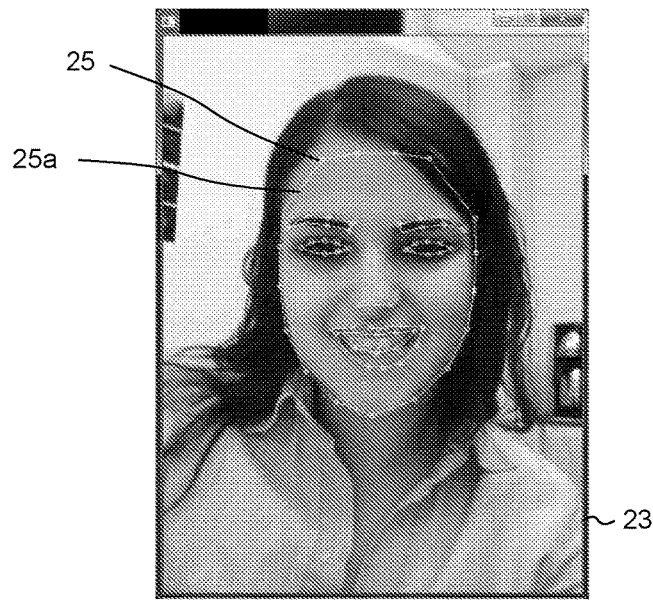
FIG. 9 shows an example of user-defined shapes defined a plurality of labelled feature points, displayed over a training image.
Figure 10B:
FIG. 10, which comprises FIGS. 10a to 10c, schematically illustrates examples of global and sub-shaped models generated by the training module according to an embodiment.
Figure 10C:

A brief description has been given above of the components forming part of the shape model training module 3 of an exemplary embodiment. A more detailed description of the operation of these components will now be given with reference to the flow diagram of FIG. 8, for an example computer-implemented training process using the shape model training module 3. Reference is also made to FIG. 9 schematically illustrating examples of user-defined shapes defined by labelled feature points, and to FIGS. 10a to 10c schematically illustrating examples of trained global and sub-shape models.

As shown in FIG. 8, the training process may begin at step S8-1 where the shape model training module 3 processes user input to define a plurality of labelled feature points 25 in the training images 23 of the training image database 5. For example, a user interface may be provided to prompt the user to sequentially define a set of feature points 25 for a training image 23, each labelled feature point 25 associated with a respective location in the corresponding training image 23 and having a corresponding unique identifier. FIG. 9 shows an example of a resulting user-defined shape 25a displayed over an associated training image 23, as defined by the plurality of labelled feature points 25. The data may be defined as a set or array of x and y positions in the image, defining respectively the x-axis and y-axis position in the image of each user-defined feature point 25 in the training image 23. The plurality of feature points 25 may be grouped into subsets of feature locations, each subset corresponding to respective sub-aspects of the overall object. In the present example, the overall object is a subject's face and the sub-aspects may be i) the lips, mouth and chin, and ii) the eyes, eyebrows, nose and face outline.

At step S8-3, the shape model module 21 of the shape model training module 3 determines a global shape model 27 for the trained face model 31, based on the training images 23 and associated feature points 25 retrieves from the training image database 5. Any known technique may be used to generate the global shape model 27. For example, in this embodiment, the shape model module 21 uses the Active Shape Modelling (ASM) technique, as mentioned above. FIG. 10a shows a schematic representation of an example global shape model 27 generated by the shape model module 21 using the ASM technique. In the illustrated example, the global shape model 27 of a subject's face includes three modes of variation as determined by the shape model module 21 from the training data. Each mode describes deviations from the same mean shape 27a of the global shape model, illustrated in the middle column, the deviations differing for each respective mode. For example, the illustrated mode zero represents deviations resulting from the subject's face turning left and right the second mode represents deviations of the lip and mouth in various open and closed positions, while the third mode represents deviations of the subject's face tilting vertically up and down.

It will be appreciated that the data structure of the global shaped model 27 will depend on the particular shape modelling technique that is implemented by the shape model module 21. For example, the ASM technique processes the distribution of user-defined feature locations in the plurality of training images 23 in order to decompose the data into a set of eigenvectors and eigenvalues, and a corresponding set of parameters/weights between predefined limits, to define a deformable global shape model for a subject's face. The precise steps of the ASM technique are known per se, and need not be described further.

At step S8-5, the shape model module 21 determines one or more sub-shape models 29, again using the same shape modelling technique used to generate the global shape model 27. In this step, the ASM technique for example is applied to the respective subsets of feature locations, to generate respective sub-shape models 29 corresponding to respective sub-aspects of the overall face. FIG. 10b shows an example of a first sub-shape model 29-1 corresponding to the lips, mouth and chin of a subject's face. FIG. 10c shows an example of a second sub-shape model 29-2 corresponding to the eyes, eyebrows, nose and face outline of a subject's face. It will be appreciated that the number of modes of variation for a global and sub-shape model may vary depending on the complexity of the associated training data.

Returning to FIG. 8, at step S8-7, the sub-shape appearance module 33 determines a sub-shape appearance model 35 for one or more of the sub-shape models 29 generated by the shape model module 21. In this example embodiment, an appearance model 35 is generated for the first sub-shape model 29 corresponding to the lips, mouth and chin of a subject's face. Any known technique for generating an appearance model 35 may be used, for example the Active Appearance Model (AAM) technique, as mentioned above. The particular implementation steps of this technique are known per se, and need not be described further. The result of the AAM technique applied by the sub-shape appearance module 33 is a deformable sub-shape appearance model 35 comprising a mean normalised grey level vector, a set of orthogonal modes of variation and a set of grey level parameters.

At step S8-9, the combined sub-model module 37 determines a sub-shape combined model 39 for each sub-shape appearance model 35, based on the corresponding sub-shape model generated by the shape model module 21. For example, the shape model derived from the labelled training images 23 can be processed to generate a set of shape model parameters, and the sub-shape appearance model 35 may be similarly processed to generate corresponding appearance model parameters. The shape model parameters and the appearance model parameters can then be combined, with a weighting that measures the unit differences between shape (distances) and appearance (intensities). As with the ASM and AAM techniques, the combined model can be generated by using principle component analysis and dimensionality reduction, resulting in a deformable combined model represented by a set of eigenvectors, modes of variation and deviation parameters.

Figure 11:
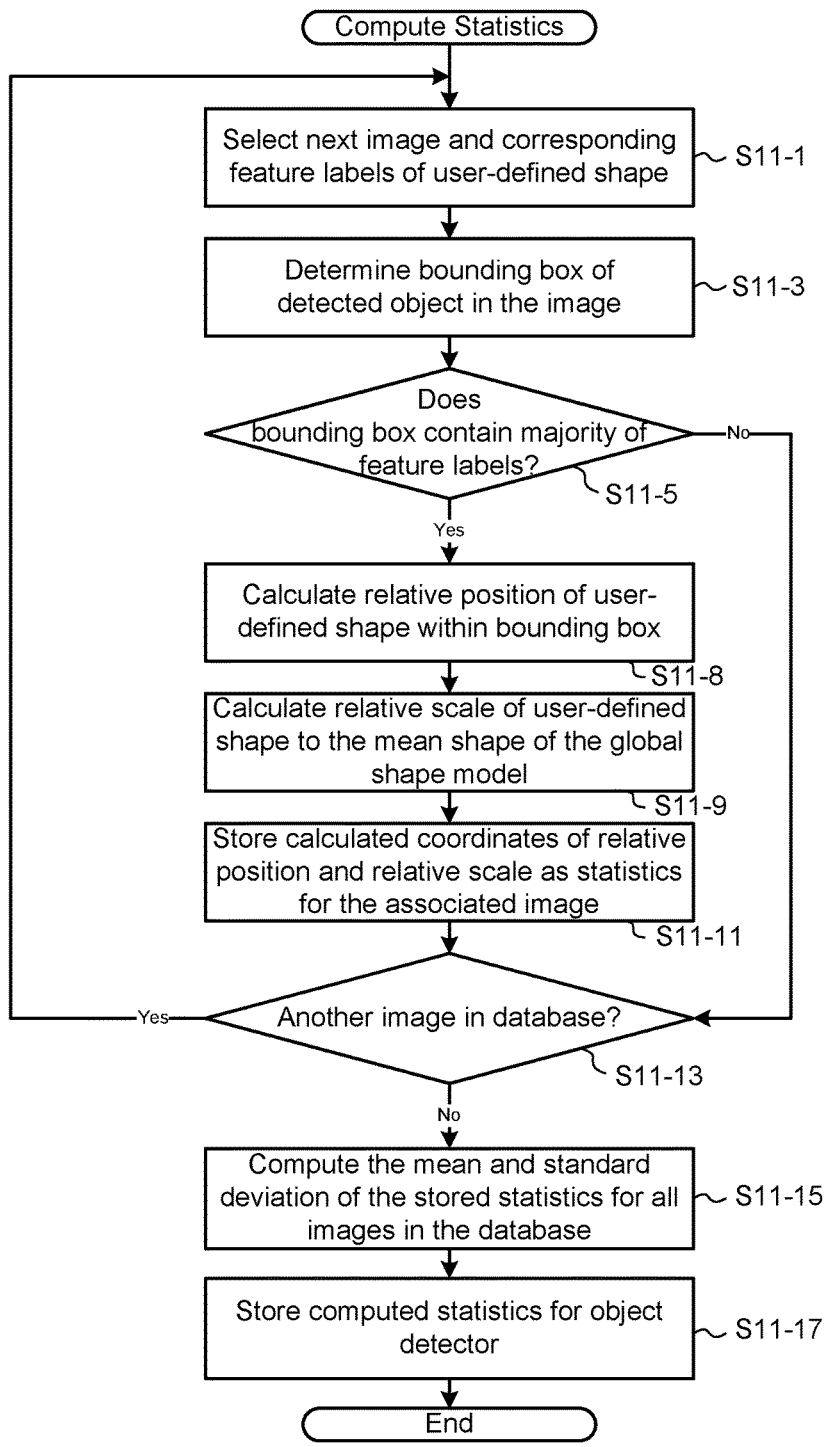
FIG. 11 is a flow diagram illustrating the processing steps performed by the shape model training module to compute statistics based on the object detector output and user-defined shape, according to an embodiment.

At step S8-11, the statistics computation module 41 can be used to compute a set of statistics to improve the robustness of initial positioning of a detected face within a bounding box output by the object detector module 42. This exemplary processing is described in more detail with reference to FIG. 11. As shown in FIG. 11, at step S11-1, the statistics computation module 41 selects a first image from the training images 23 in the image database 5. The corresponding feature points 25 of the user-defined shape for the training image 23 are also retrieved from the training image database 5. At step S11-3, the selected training image 23 is processed by the object detector module 42 to determine a bounding box of a detected subject's face in the image 23. FIG. 12a shows an example of a detected face in a training image, identified by the bounding box 51.

At step S11-5, the statistics computation module 41 determines if the identified bounding box 51 contains the majority of feature points 25 of the corresponding user-defined shape 25. For example, a threshold of 70% can be used to define a majority for this step. If it is determined that the bounding box 51 does not contain the majority of feature points 25, then position and scale statistics are not computed for the particular training image 23 and processing skips to step S11-13 where the statistics computation module 41 checks for another training image to process. On the other hand, if it is determined that the bounding box 51 contains a majority of the feature points 25, then at step S11-7, the relative position of the user-defined shape, as defined by the feature points 25, within the identified bounding box 51 is calculated. At step S11-9, the statistics computation module 41 calculates the relative scale of the user-defined shape to the means shape 27*a* of the global shape model 27. At step S11-11, the calculated coordinates of the relative position and the relative scale are stored for example in the training image database 5, for subsequent computations as described below.

At step S11-13, the statistics computation module 41 determines if there is another training image 23 in the database 5 to be processed, and returns to step S11-1 to select and process the next image 23, as necessary. When it is determined that all of the training images 23, or a pre-determined number of training images 23, have been processed by the statistics computation module 41, at step S11-15, a mean and standard deviation of the stored relative position and scale for all of the processed training images 23 is computed, and stored as computed statistics 44 for the particular face detector module 42, for example in the training image database 5.

Returning to FIG. 8, the offline training process proceeds to step S8-13, where the regression computation module 43 of the shape model training module 3 proceeds to determine regression coefficient matrices 45, 47 for the global shape model 27 and the plurality of sub-shaped models 29. This process is described in more detail with reference to FIGS. 13 and 14. The regression computation module 43 computes the regression coefficient matrices 45, 47 based on feature point descriptors and corresponding offsets that are determined from the training images 23 in the database 5. In the present embodiment, the feature point descriptors are Binary Robust Independent Elementary Features (BRIEF) descriptors, derived from the calculated conversion of an input global or sub-shape feature points to a selected image, but other feature descriptors can be used instead such as ORB, FREAK, HOG or BRISK.

As is known in the art, regression analysis is a statistical process for modelling and analyzing several variables, by estimating the relationship between a dependent variable and one or more independent variables. As mentioned above, the regression coefficient matrices 45, 47 define trained functions that represent a series of directions and re-scaling factors, such that a matrix can be applied to a candidate shape model to produce a sequence of updates to the shape model that converge to an accurately located shape with respect to an input image (e.g. a training image during a training process, or a captured image during a tracking process). In this embodiment, the plurality of sub-shape regression matrices 47 are arranged as a cascading data structure. Each regression matrix in level i, overcomes situations where the previous regression coefficient matrix did not lead to the final solution. For example, the first, highest level regression coefficient matrix approximates a linear function that tries to fit all cases in the database. The second and further lower level regression matrices fit situations that the first level regression matrix was not able to cope with. This cascading data structure thereby provides a more flexible function with improved generalization across variations in object shapes. The training process to determine the cascading sub-shape regression coefficient matrices 47 simulates similar captured image scenarios which might be captured and processed during the tracking procedure, utilising stored training data 5 defining the real or actual displacement or offset between the estimated and real position of the object shape feature points that are known for the training images 23 in the database 5. The texture around an estimated shape is described by the BRIEF features and the offset between corresponding labelled feature points can be measured in pixels coordinates in the reference image resolution.

Figure 13A:
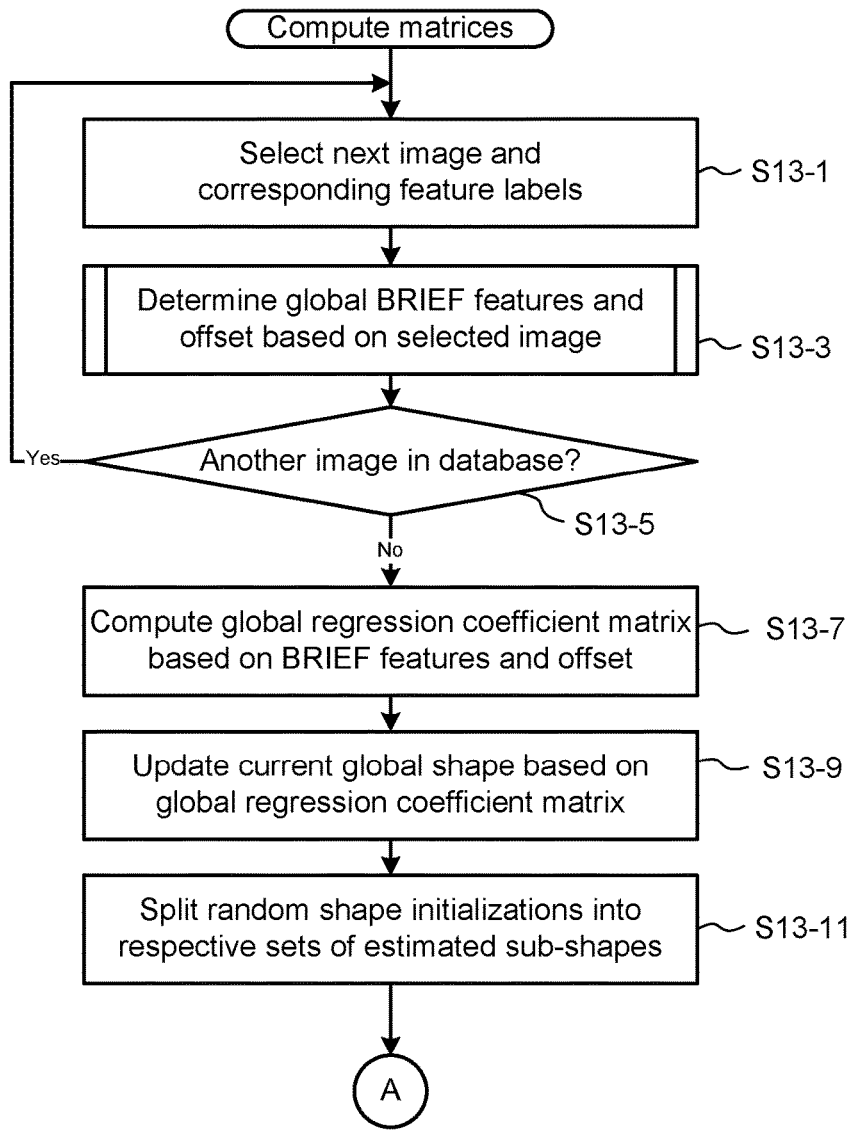
FIG. 13 is a flow diagram illustrating the main processing steps performed by the shape model training module of FIG. 4 to determine cascading regression coefficient matrices according to an embodiment of the invention.
Figure 13B:
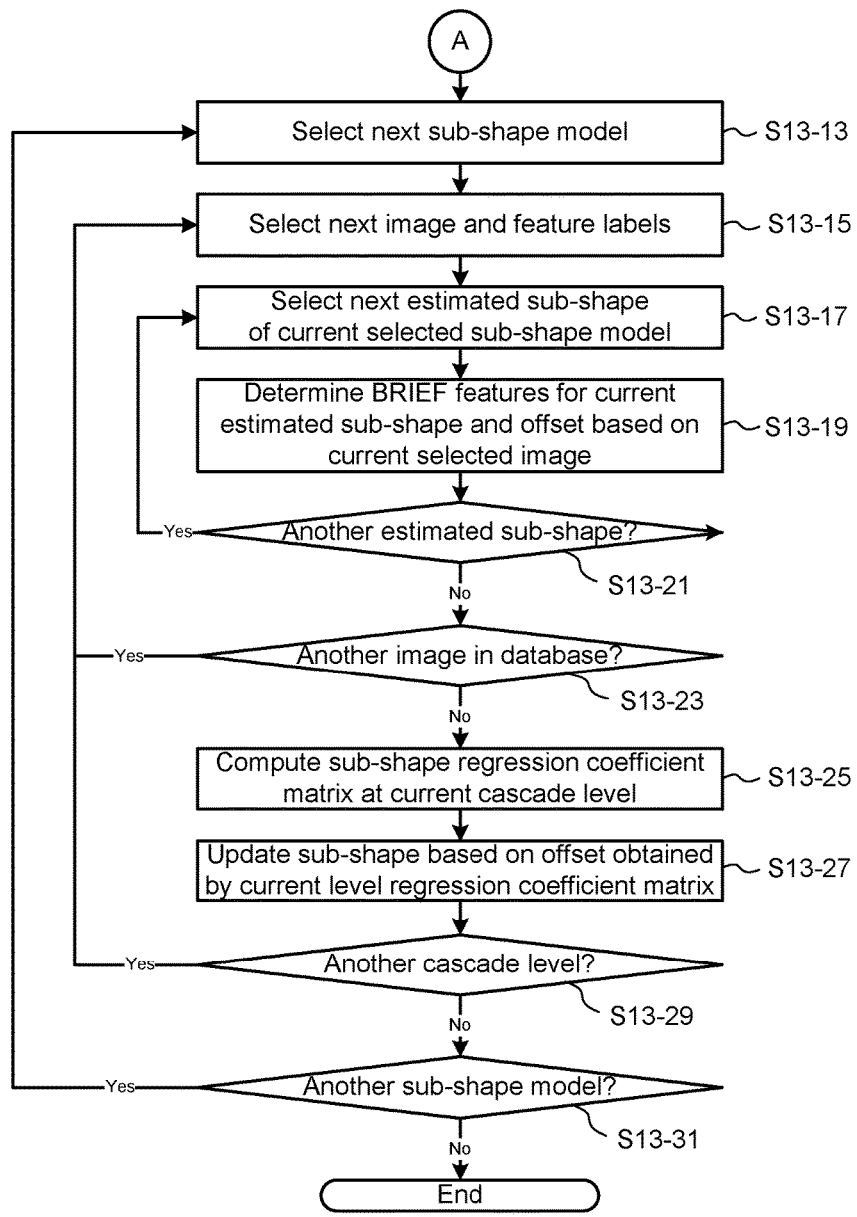
Figure 14:
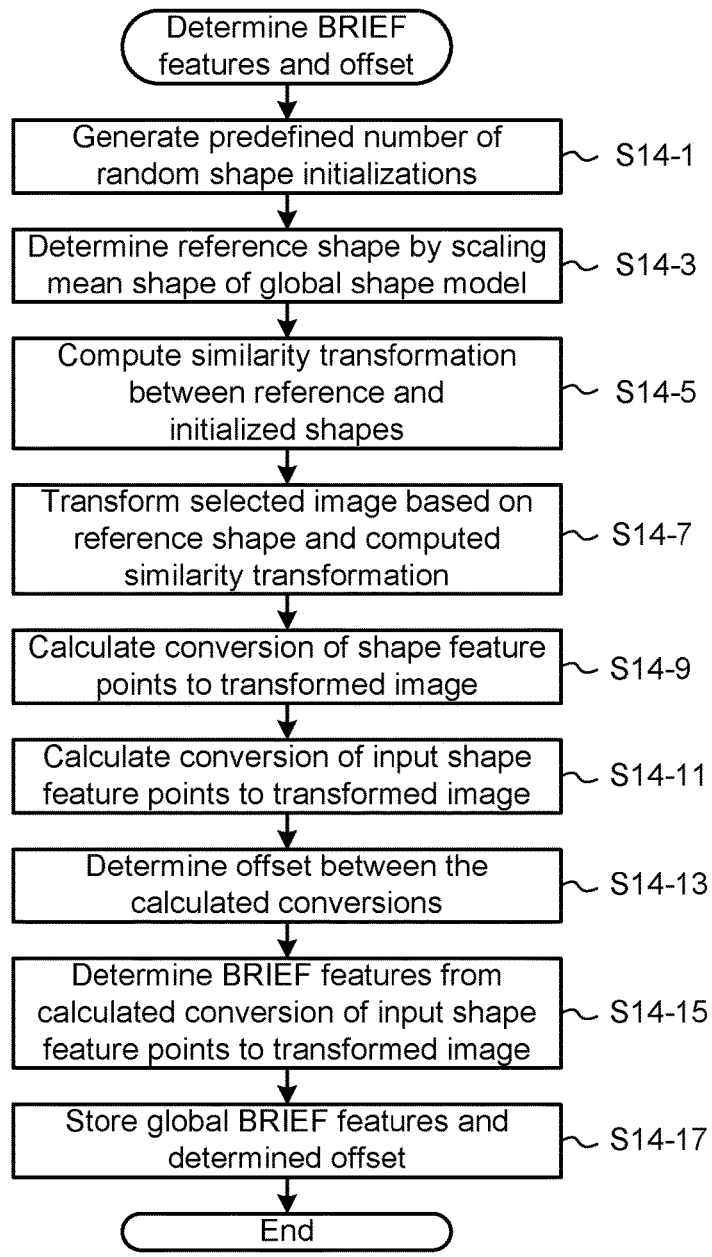
FIG. 14 is a flow diagram illustrating the sub-processing steps performed by the training module to determine offset values and feature point descriptors based on a selected training image.

As shown in FIG. 13*a*, at step S13-1, the regression computation module 43 selects a first image 23 and corresponding feature points 25 from the trained image database 5. At step S13-3, the regression computation module 43 computes and stores a first set of BRIEF features for the global shape 29 and corresponding offsets, based on the selected training image 23. The process carried out by the regression computation module 43 to process a selected training image 23 is described with reference to FIG. 14.

At step S14-1, the regression computation module 43 generates a pre-defined number of random shape initialisations 53, based on the generated global shape model 27. This generation process involves a bounding box obtained by the object detector module 42 and the output of the statistics computation module 41. A random value is obtained for x and y displacements within the bounding box and scale relation with the mean shape 27*a*. Random values are extracted from the 68% of values drawn from a normal distribution or within one standard deviation away from the mean. For example, twenty random values may be computed for scale and x and y displacements, based on the computed statistics stored by the statistics computation module 41 at step S8-11 above, in order to generate a total of twenty different initializations for a single bounding box. This sub-process can be seen as a Monte Carlo initialization procedure which advantageously reduces over-fitting and provides a set of regression coefficient matrices that are capable of more generalised object representations than determinist methods or single initialization estimates, for example. FIG. 12*b* shows an example of various random shape initialisations 53 displayed over the initial global shape model 27, for a particular training image 23.

At step S14-3, a reference shape is determined by scaling the mean shape 27*a* of the global shape model 27, based on a pre-defined value specified by the user, for example 200 pixels as inter-ocular distance. This procedure determines the size of the image where all the computations will be performed during training and tracking. A conversion between shape model coordinates frame in unit space to the image plane in pixel coordinates is performed. FIG. 12*c* schematically illustrates an example of scaling of the mean shape and FIG. 12*d* schematically illustrates an example of the resulting reference shape 55. At step S14-5, the regression computation module 43 computes the similarity transformation between the reference shape 55 and the plurality of random shape initialisations 53.

Figure 12E:
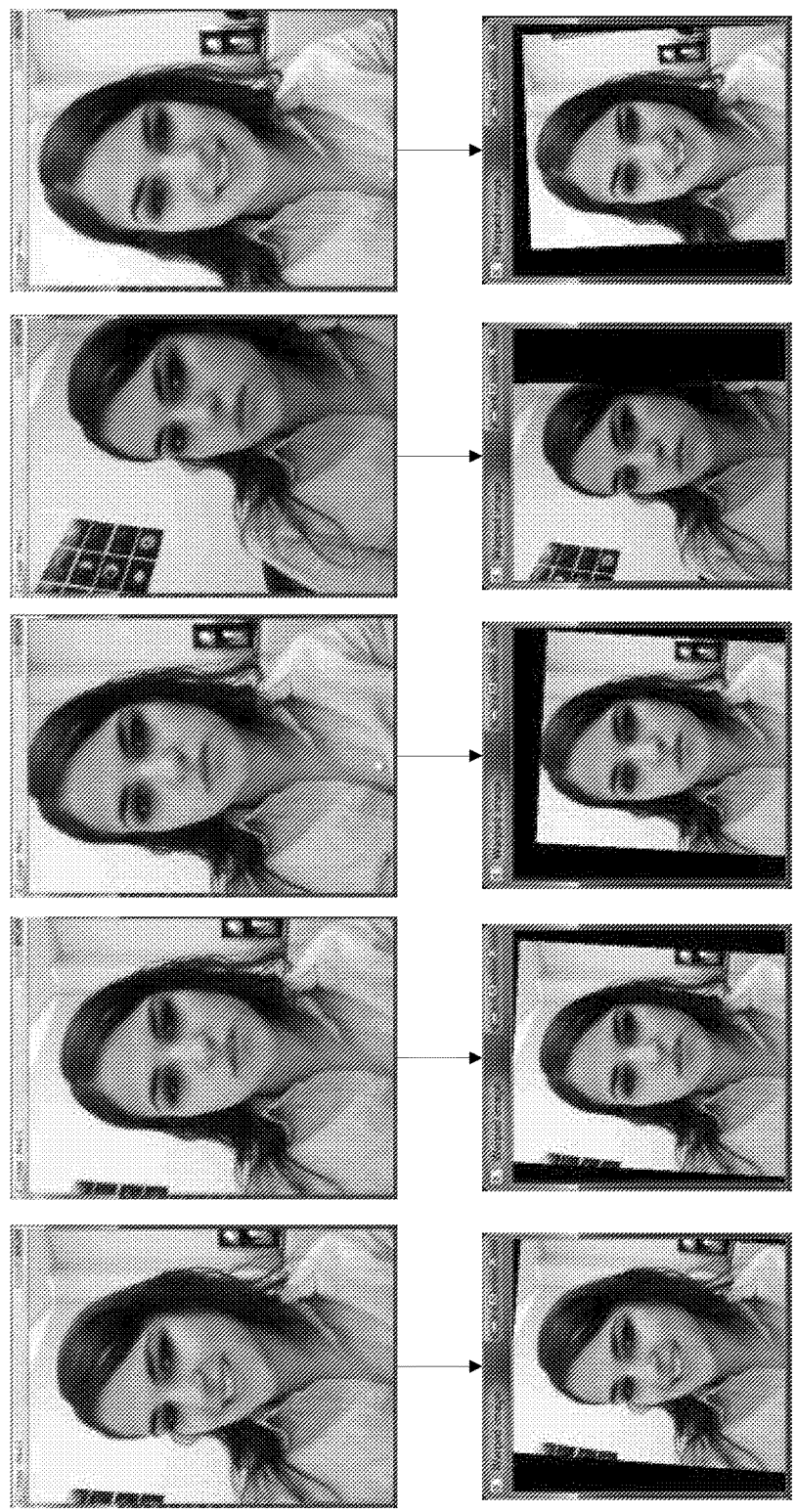

At step S14-7, the regression coefficient module 43 performs image processing on the selected training image 23 to transform the selected training image 23 based on the reference shape 55 and the computed similarity transformation. In this embodiment, the similarity transformation between the current estimate and the reference shape is computed through an iterative process aiming to minimize the distance between both shapes, by means of geometric transformations, such as rotation and scaling, to transform (or warp) the selected training image 23. In the first iteration, just scaling has a role since the first estimation is a scaled mean shape therefore, the rotation matrix will always be an identity matrix. In further iterations, once the initial scaled mean shape has been modified by the refinement process, scale and rotation will be of great importance. Subsequent regression coefficient matrices will operate in transformed images which will be very closely aligned with the reference shape. FIG. 12*e* shows examples of various geometric transformations that can be performed on respective training images 23. Advantageously, image transformation in this embodiment is applied globally to the whole image by means of a similarity transformation, in contrast for example to piece-wise affine warping as employed in AAM, whereby no deformation is performed and computation speed is improved considerably.

At step S14-9, the regression computation module 43 calculates a conversion of the feature points 25 of the user-defined shape for the selected training image 23, to the corresponding locations for the labelled feature points in the transformed image generated at step S9-9. At step S14-11, the regression computation module 43 calculates a conversion of the input shape, that is the random shape initialization as defined by the process S9-3 and the current estimated shape in further iterations, to the corresponding feature locations in the transformed image. At step S14-13, the offset between the calculated conversions is determined by the regression computation module 43. At step S14-15, the regression computation module 43 determines a set of BRIEF descriptors for the current estimated shape, derived from the calculated conversion of the input shape feature points to the transformed image. The determined BRIEF descriptor features and corresponding offsets are stored by the regression computation module 43 at step S14-17, for example in the training image database 5.

Returning to FIG. 13a, at step S13-5, the regression computation module 43 determines if there is another training image 23 in the database 5 to be processed and processing returns to steps S13-1 and S13-3 where regression computation module 43 determines a corresponding set of BRIEF descriptor features and corresponding offsets, based on each of the remaining, or a predetermined number of, training images 23 in the database 5. Once all of the training images 23 have been processed in this way, a regression coefficient matrix 45 for the global shape model 27 is computed and stored for the trained object model 31 in the object model database 7, taking as input all of the stored offsets and BRIEF features determined from the training images 23.

Accordingly, at step S13-7, the regression computation module 43 computes the regression coefficient matrix 45 for the input global shape, based on the determined BRIEF features and corresponding offsets. In this embodiment, the regression computation module 43 is configured to compute the regression coefficient matrix 45 using a regression analysis technique known as Principal Component Regression (PCR), which reduces the dimensionality of the gathered BRIEF descriptors dataset before performing linear regression using least squares minimization in order to get a regression coefficient matrix. Since the obtained matrix has a dimension equal to the number of selected principal component, a conversion to the original dimensional space is efficiently computed. As known in the art, regression coefficient matrices are an optimal data structure for efficient facial feature detection, for example as discussed in "Supervised Decent Method And Its Applications To Face Alignment", Xiong and Torre. It is appreciated that alternative known regression analysis techniques may instead be used to compute the regression coefficient matrices, such as least squares regression, etc.

At step S13-9, the regression computation module 43 updates the global shape model 27 of the current trained model 31 stored in the object model database 7, by applying the respective trained functions defined by the computed global regression coefficient matrix 45 to the global shape model 27. It will be appreciated that the computational process for applying the cascading regression coefficient matrix to the input shape is known per se and will depend on the specific regression analysis technique implemented by the system 1. At step S13-11, the regression computation module 43 processes the random shape initializations generated at step S10-1 above, to split each random shape initialization into a respective set of estimated sub-shapes, according to the plurality of defined sub-shape models 29 in the object model database 7. For example, referring to the exemplary shape model in FIG. 5, the defined subset of (x,y) coordinates for features of each sub-shape 29 can be selected from each random shape initialization to obtain the respective estimated sub-shape.

The regression computation module 43 then processes the plurality of current sub-shapes 29 to generate a respective plurality of cascading sub-shape regression coefficient matrices 47 for each current sub-shape 29, based on the estimated sub-shapes obtained at step S13-11 and the training images 23 in the database 5. In this exemplary embodiment, three cascading sub-shape regression coefficient matrices 47 are defined for each current sub-shape 29. It is appreciated that any number of cascading levels can be defined. At step S13-13, the regression computation module 43 selects a first sub-shape model, and computes and stores respective BRIEF descriptor features for each estimate sub-shape of the current selected sub-shape model 29, and the corresponding offset based on the training images 23 in the database 5, at the current cascade level.

Accordingly, at step S13-15, the regression computation module 43 selects a first training image 23 and associated feature points 25 from the training image database 5 at step S13-15. At step S13-17, the regression computation module 43 selects a first one of the estimated sub-shapes of the current selected sub-shape model 29. At step S13-19, the regression computation module 43 determines and stores BRIEF descriptor features for the selected estimated sub-shape, as well as the corresponding offsets, based on the current selected training image 23. At step S13-21, the regression computation module 43 determines whether there is another estimated sub-shape to process and if so, returns to step S13-17 to select the next estimated sub-shape to be processed. Once all of the estimated sub-shapes have been processed based on the current selected training image 23 at the current cascade level, the regression computation module 43 determines at step S13-23 whether there is another training image 23 to process and if so, processing returns to step S13-15 where BRIEF features and offsets data collection process is repeated for the next training image at the current cascade level.

Once all, or a predetermined number, of the training images 23 have been processed in the above way for the current cascade level, the regression computation module 43 computes at step S13-25 a sub-shape regression coefficient matrix 47 for the current selected sub-shape, at the current cascade level, based on all of the determined BRIEF features and corresponding offsets. At step S13-27, the regression computation module 43 updates all of the estimated sub-shapes, by applying the offsets obtained from the respective trained functions defined by the current cascade level sub-shape regression coefficient matrix 47, to the sub-shape model 27. At step S13-29, the regression computation module 43 determines if there is another cascade level of the cascading sub-shape regression coefficient matrices 47 to be generated, and if so, returns to step S13-15 where the process is iteratively repeated for the remaining cascade levels.

After the regression computation module 43 determines at step S13-29 that the current selected sub-shape model 29 has been processed in the above manner for all of the predetermined cascade levels, then at step S13-31, the regression computation module 43 determines if there is another sub-shape model 29 to process and returns to step S13-13 to select the next sub-shape 29, and to subsequently compute the cascading regression coefficient matrices 47 for the next selected sub-shape 29 and update the next sub-shape 29, until all of the sub-shapes 29 have been processed and updated by the shape model training module 3 as described above.

Tracking Process

The tracking process performed by the tracking module 11 in the system 1 will now be described in more detail with reference to FIG. 15, which shows the steps of an example computer-implemented tracking process in another embodiment of the present invention. Reference is also made to FIGS. 18a to 18e, illustrating an example sequence of user interface display screens during the tracking process.

Figure 15:
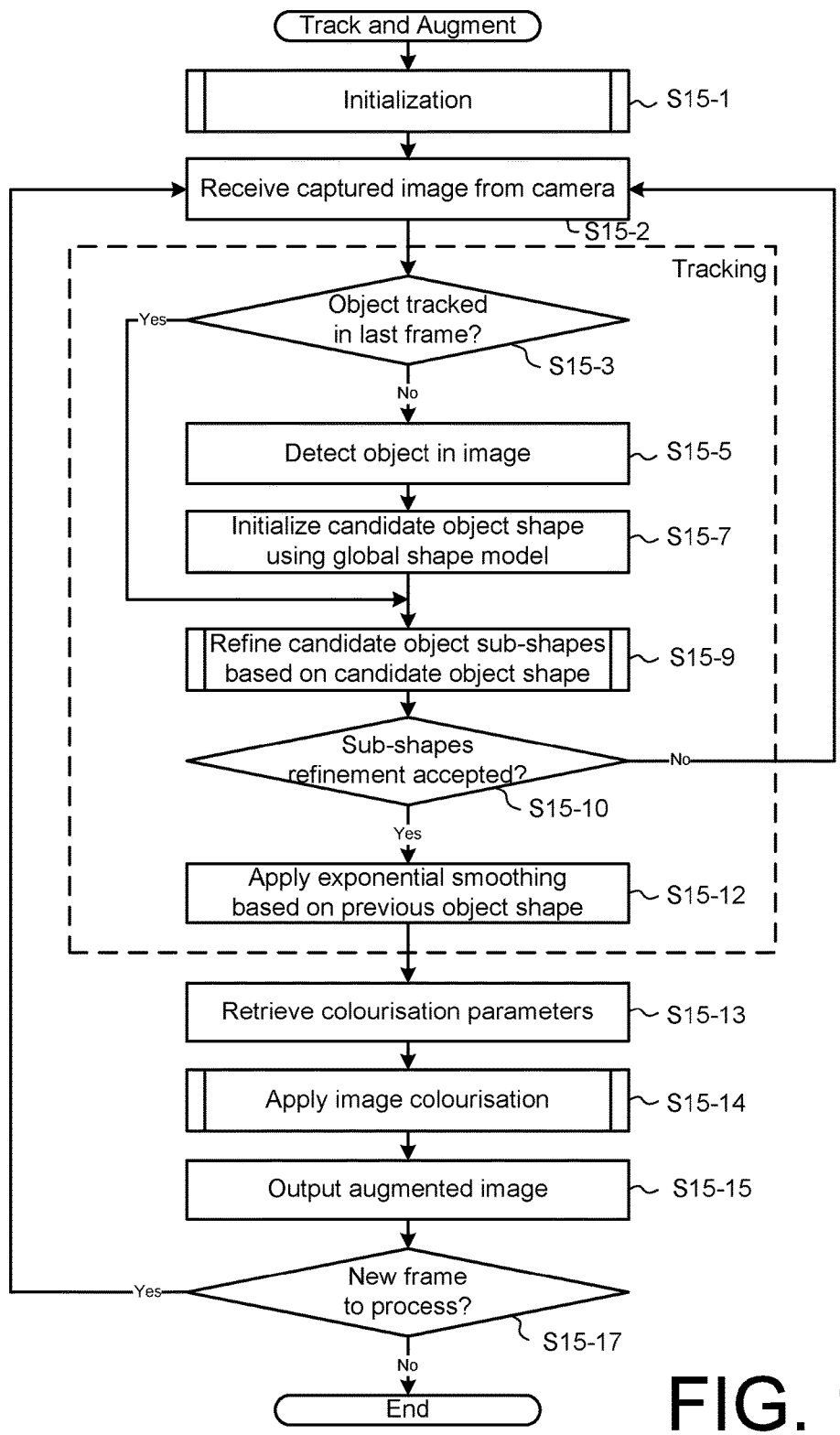
FIG. 15 is a flow diagram illustrating the main processing steps performed by the system of FIG. 1 to track and augment objects in a captured image according to an embodiment.
Figure 16:
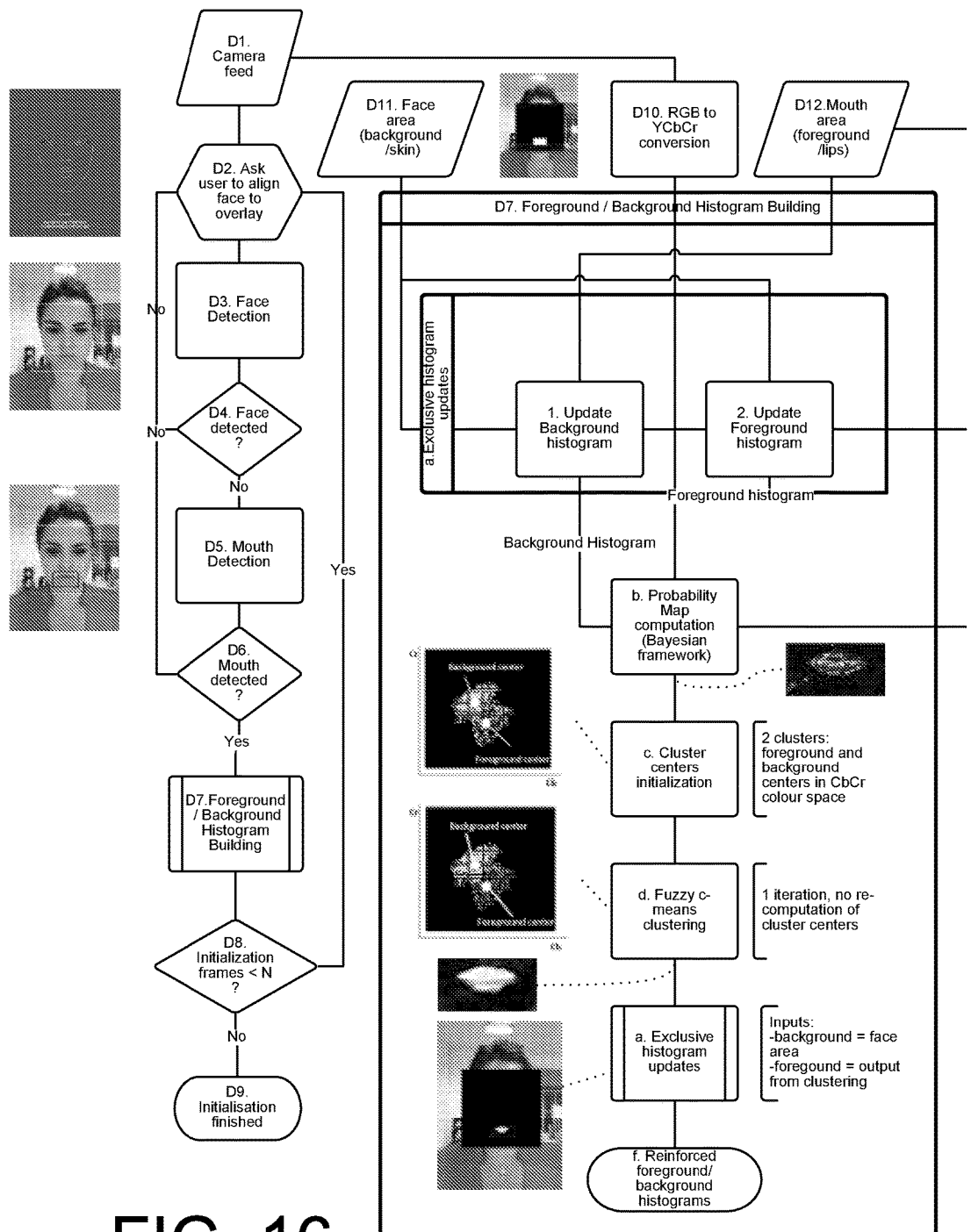
FIG. 16 is a flow diagram illustrating the processing steps of an initialization process performed by the tracking module.

As shown in FIG. 15, at step S15-1, the tracking module 11 may perform an initialisation sub-process based on received data of an initial captured image from the camera. One example of this processing is described in more detail with reference to FIG. 16. As shown in FIG. 16, the process starts with the supply of a camera feed at a step D1. The camera captures a (video) image of the user, and displays this to the user, for example on a tablet computer which the user is holding. An overlay is also shown on screen, which might for example comprise an outline or silhouette of a person's face. The user is required to align the image of their face with the overlay at a step D2. An example of the displayed image overlay is shown in the representation provided to the left of the step D2.

At a step D3, a face detection step is carried out, which might for example use Haar-like features (discussed for example in "Zur Theorie der orthogonalen Funktionensysteme", Haar, Alfred (1910), 69(3): 331-371). These Haar-like features can be used to pick out the location and scale of the face in the image. An example of this, in which the location of the detected face is identified by a bounding rectangle, is shown in the representation provided to the left of the step D3. At a step D4 it is determined whether or not the face has been detected. If the face has not been detected, then processing cannot go any further, and the process returns to the step D2, for the user to realign their face with the overlay. If the face has been detected, then at a step D5 a mouth detection step is carried out, which might again for example use Haar-like features—this time to pick out the location of the mouth. In order to improve processing efficiency, the search for the mouth can be constrained to lower part of the bounding rectangle already found for the face. An example of a detected mouth area is shown in the representation provided to the left of the step D5. At a step D6, it is determined whether or not the mouth has been detected. If the mouth has not been detected, then processing cannot go any further, and the process returns to the step D2, for the user to realign their face with the overlay.

If the mouth has been detected, then at a step D7 a process of building foreground and background histograms is carried out. Foreground refers to the target area to be detected for example lip regions and background refers to the area to be excluded from the foreground for instance skin regions. The foreground and background histograms are populated with a frequency of colour values occurring in different regions of the image. These regions are defined, for example, by a mask created with the face as background and the mouth as the foreground, as discussed above. In some embodiments one or more histogram updates might be carried out using the same source image and the same mask. The foreground/background histogram building process uses as an input a version of the camera feed, which may be converted from the camera image data colour space (e.g. RGB/RGBA) to a working colour space (e.g. YCrCb), at a step D10. The input colour format depends on the camera installed in the device employed by the user. It is appreciated that the YCrCb colour space is useful, since the histogramming can be carried out in two dimensions by ignoring luminance (Y) and utilising only the colour difference values Cr and Cb.

The step D7 comprises a sub-step D7a of providing exclusive histogram updates based on a face area (background/skin) provided at a step D11 and a mouth area (foreground/lips) provided at a step D12. By exclusive it is meant that updates in the foreground histograms by foreground masks increases the frequency of the corresponding colour but updates the background histogram as well by decreasing the frequency of that same colour. In other words, if the colour belongs to the foreground it can not belong to the background. Therefore, the update of any colour coming from background or foreground produces effects in both histograms. The representation visible between the steps D10 and D11 illustrates the mouth area (white—foreground), and the face area (black—background) employed in the exclusive histogram updates step D7a. At a step D7a1, a background histogram is updated with the frequency of occurrence of each colour value within the face area (but outside of the mouth area). Similarly, at a step D7a2, a foreground histogram is updated with the frequency of occurrence of each colour value within the mouth area. The next steps which take place in the histogram building procedure D7 are meant to improve the quality of the generated histograms.

The background histogram, foreground histogram, and the converted image data are provided to a probability map computation step D7b, which for instance uses a Bayesian framework (or similar statistic technique) to determine the probability of a particular pixel belonging to the lips (foreground) by means of the foreground and background histograms. An example of such a probability map is shown to the right of the step D7b. The probability map computation can be calculated using Bayesian inference to obtain the posterior probability according to Bayes' rule, demonstrated below:

$$P(A|B) = \frac{P(B|A)P(A)}{P(B)} \propto P(B|A)P(A)$$

The probability of a pixel with colour (Cb,Cr) of belonging to the foreground (or being lip) can be computed as follows:

$$P(Cb|Cr) = \frac{P(\text{lip}|Cb, Cr)}{P(\text{lip}|Cb, Cr) + p(\text{nonlip}|Cb, Cr)}$$

where $P(\text{lip}|Cb,Cr) = P(Cb,Cr|\text{lip}) \cdot P(\text{lip})$ $(\text{nonlip}|Cb,Cr) = P(Cb,Cr|\text{nonlip}) \cdot P(\text{nonlip})$ The conditional probabilities are calculated by means of the statistics stored in the histogram building procedure employed as follows:

$$P(Cb, Cr \mid \text{lip}) = \frac{foregroundHistogram(Cb, Cr)}{numLipPixels}$$

$$P(Cb, Cr \mid \text{nonlip}) = \frac{backgroundHistogram(Cb, Cr)}{numNonLipPixels}$$

$$P(\text{lip}) = \frac{numLipPixels}{numTotalPixels}$$

$$P(\text{nonlip}) = \frac{numNonLipPixels}{numTotalPixels}$$

Once the probability map of being lip has been computed around the mouth area, the result will be used in order to reinforce the histogram quality through a clustering process which will produce a finer segmentation of the lip area.

At a step D7c, cluster centres for background and foreground are initialised in CbCr colour space. The background cluster centre is computed with colour values corresponding to pixels within the probability map (and thus constrained to the mouth area) which have an associated probability of less than a predetermined threshold value—for example a value of 0.5 in the case of a probability range of 0 to 1. The foreground cluster centre is calculated with colour values corresponding to pixels within the probability map (and thus constrained to the mouth area) which have an associated probability higher than the predetermined threshold value. The cluster centre for each of these is determined as the centre of gravity of all of the points belonging to foreground or background.

An example of the initialization of the clustering procedure, showing the two cluster centres, is visible in the representation to the left of and slightly above the step D7c. Here it can be observed colour values detected as background as light grey colour and foreground pixels as dark grey tone. This figure represents the probability map, shown in the representation on the right on the process D7c, expressed in the colour-space CbCr. It is noticeable that the amount of pixels belonging to the foreground is very spare and indeed difficult to appreciate in the figure; however good enough to give an accurate approximation of where the centre of the cluster might be. This proximity of the clusters is due to the high similarity between skin and lip colour. In the case of selecting skin as foreground and any other colour as background, the clusters will be much further apart and the situation will be easier to overcome. This is an extreme example which proves the success of the algorithm.

At a step D7d, a fuzzy c-means clustering algorithm is used to associate the colour values in the CbCr space observed in the mouth area with the closest cluster centre. This can be carried out by determining the degree of membership of each colour value to the foreground cluster centre. This would effectively shift certain colour values from belonging to one cluster to belonging to the other cluster. An example of the reordering provided by this process is visible in the representation provided to the left of and slightly above the step D7d. The output of this process generates an equivalent probability map to that generated from the original histogram data but it should show a much stronger lip structure, as visible in the representation provided beneath the cluster representations. It should be noted that only a single pass of the fuzzy c-means clustering algorithm is carried out (no iteration). There is no re-computation of the cluster centres. This is because the clusters are too close together and many/further iterations might cause misclassifications.

The fuzzy c-means clustering may be carried out by minimising the following objective function:

$$J_m = \sum_{i=1}^{N} \sum_{j=1}^{C} u_{ij}^m \|x_i - c_j\|^2,$$

where $1 \leq m \leq \infty$ and uij is the degree of membership of xi (CbCr value) in the cluster j.

$$u_{ij} = \frac{1}{\sum_{k=1}^{C} \left( \frac{\|x_i - c_j\|}{\|x_i - c_k\|} \right)^{\frac{2}{m-1}}},$$

where m (fuzziness)=2

$$c_j = \frac{\sum_{i=1}^{N} u_{ij}^m \cdot x_i}{\sum_{i=1}^{N} u_{ij}^m}$$

After the computation of step D7d, an exclusive histogram update step D7a reinforce the content of the histograms based on the output of the clustering stages. In particular, the background histogram is populated with the frequency of occurrence of colour values in the background (face area)—i.e. associated with the background cluster, while the foreground histogram is populated with the frequency of occurrence of colour values in the foreground (lip area)—i.e. associated with the foreground cluster. The representation to the left and above the step D7f shows the regions employed for the histogram updates where the background is the face area and the new strongly defined lip area forms the foreground. Following the histogram building step, at a step D8 it is determined whether a sufficient number of initialisation frames have been processed for the completion of the histogram building process. If less than N frames were processed then the process returns to the step D2, where the user is required to maintain facial alignment with the overlay, and the process of face/mouth detection, histogramming and clustering starts again.

The histograms are accumulated in this way over several frames, improving the robustness of the foreground and background histograms. When at the step D8 it is determined that the threshold number of initialisation frames has been reached, the initialisation process finishes, and the initialised histograms are carried through into the next stage of real-time processing. At this stage the displayed overlay can be removed from the display. It should be understood that while the histogram does not need updating every frame during the tracking process, it is desirable to update the histogram periodically, for example to account for lighting changes. The reinforcement of the histograms can takes place after the initialization and during the tracking procedure in order to overcome situations in which the user experiences changes in the scene such as lighting which affects directly to colour features.

Figure 18:
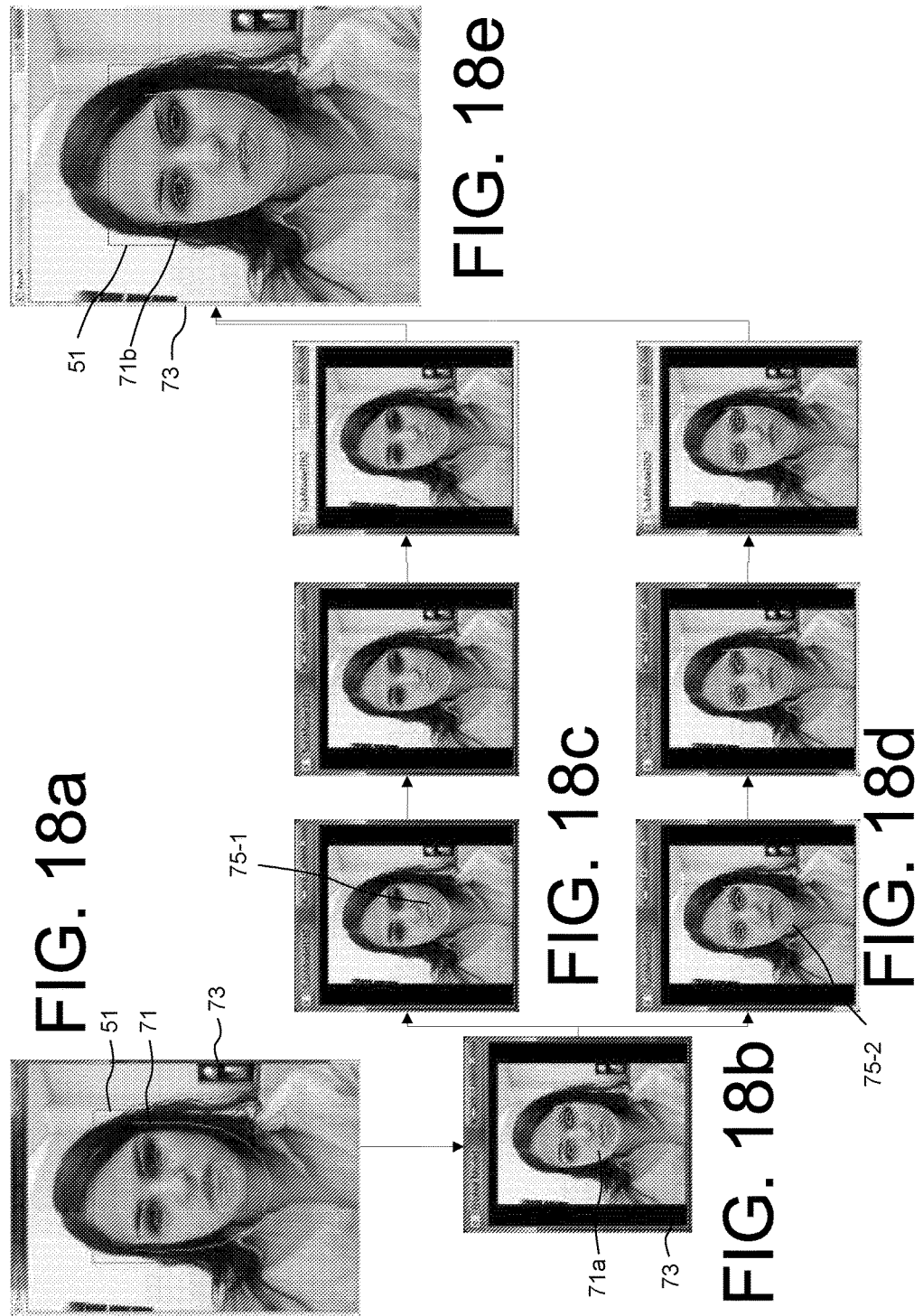
FIG. 18, which comprises

Returning to FIG. 15, at step S15-2, the initialised tracking module 11 receives captured image data from the camera 9, which can be an image in a sequence of images or video frames. At step S15-3, the tracking module determines if an object, a subject's face in this exemplary embodiment, was previously detected and located for tracking in a prior image or video frame. In subsequent iterations of the tracking process, the tracking module 11 may determine that the object was previously detected and located, for example from tracking data (not shown) stored by the system 1, the tracking data including a determined global object shape of the detected object, which can be used as the initialised global object shape for the current captured image. As this is the first time the tracking process is executed, processing proceeds to step S15-5 where the captured image data is processed by the object detector module 42 to detect an object in the image and to output a bounding box 51 of an approximate location for the detected object. At step S15-7, the tracking module 11 initialises the detected object shape using the trained global shape model 27, the statistics computed at step S8-11 above, and the corresponding global shape regression coefficient matrix 45 retrieved from the object model database 7, based on the image data within the identified bounding box 51. FIG. 18*a* shows an example of an initialised object shape 71 within the bounding box 51, displayed over the captured image data 73. The trained object model may be generated by the shape model training module 3 as described by the training process above. As shown, the candidate object shape at this stage is an initial approximation of the whole shape of the object within the bounding box 51, based on the global shape model 27. Accordingly, the location and shape of individual features of the object, such as the lips and chin in the example of FIG. 18*a*, are not accurate.

Figure 17:
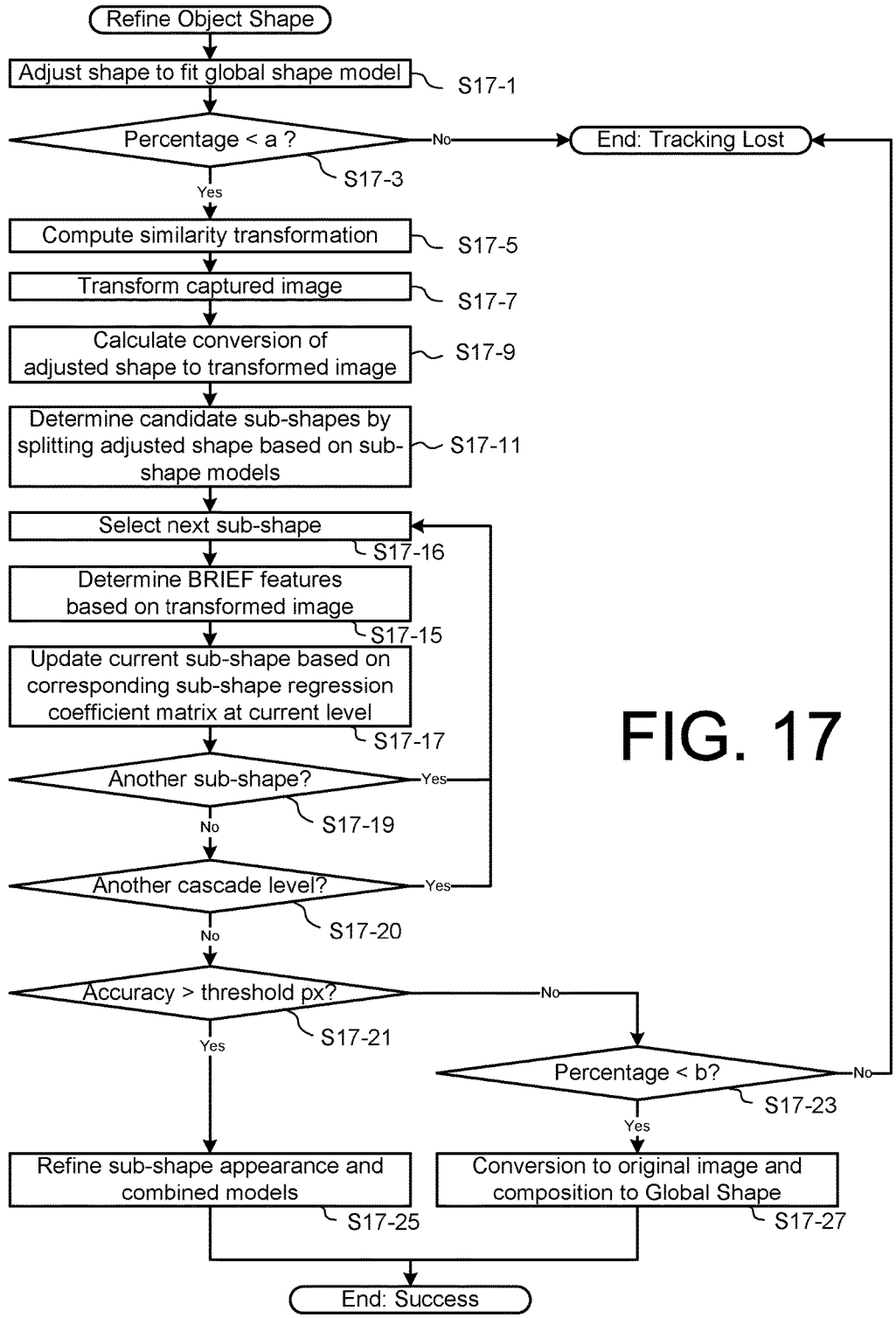
FIG. 17 is a flow diagram illustrating the processing steps performed by the tracking module to refine an object shape according to an embodiment.

At step S15-9, the tracking module 11 performs processing to refine the initialised global object shape using the trained sub-shape models 29 and its corresponding cascading regression coefficient matrices 47 for each sub-shape model 29. This processing is described in more detail with reference to FIG. 17. As shown in FIG. 17, at step S17-1, the refinement process starts with the tracking module 11 computing and adjusting the nearest shape fitting the global shape model. The weighting of the eigenvectors or parameters of the model for the computed plausible shape should be contained in the scope of valid shapes. A valid shape is defined to have their parameters between some boundaries. Given the shape computed in the previous frame, it is checked if the output from the sub-shape regression coefficient matrices computed independently fits the global shape model definition before proceeding further. Accordingly, at step S17-3, it is determined if the percentage of parameters out of boundaries is greater than a predefined threshold a. In the positive case, tracking of the object is considered to be lost. If so, the refinement process is terminated and processing may return to step S15-1 where a new captured image is received from the camera for processing. Otherwise, the refinement module 61 proceeds to adjust the object shape to fit the global shape model 27, at step S17-3.

At step S17-5, the refinement module 61 computes a similarity transformation between the adjusted shape and the reference shape defined in S9-5. At step S17-7, the captured image is transformed based on the computed similarity transformation. At step S17-9, the refinement module 61 calculates a conversion of the adjusted shape to the transformed image. FIG. 18*b* shows an example of the refined, adjusted global object shape 71*a* displayed over the captured image data 73. At step S17-11, the refinement module 61 determines a plurality of candidate sub-shapes from the current adjusted global shape, based on the sub-shape models 29 as discussed above. The candidate sub-shapes are then updated by iteratively applying the corresponding cascading sub-shape regression coefficient matrices 47 to the sub-shape, starting with the highest, most generalised cascade level.

Accordingly, at step S17-13, the refinement module 61 selects a first of the candidate sub-shapes. The refinement module 61 then determines at step S17-15 a BRIEF descriptor for the candidate sub-shape, based on the transformed image at the current cascade level. At step S17-17, the refinement module 61 updates the current candidate sub-shape based on the corresponding sub-shape regression coefficient matrix 47 at the current cascade level, retrieved from the object model database 7. As discussed above, this updating step will depend on the particular regression analysis technique implemented by the system 1 to apply the trained function defined by the sub-shape regression coefficient matrix 47 to the sub-shape data values. At step S17-19, the refinement module 61 determines if there is another candidate sub-shape to process and returns to step S17-13 to select the next sub-shape to be processed at the current cascade level. Once all of the candidate sub-shapes have been processed at the current cascade level, the refinement module 61 determines at step S17-20 if there is another cascade level to process, and processing returns to step S17-13 where the sub-shape refinement process is repeated for the next cascade level. FIGS. 18*c* and 18*d* show examples of respective sequences of refinement of the two object sub-shapes 75-1, 75-2, displayed over the captured image data 73.

When it is determined at step S17-20 that all of the sub-shapes have been processed for all of the cascade levels of the sub-shape regression coefficient matrices 47, then at step S17-21, the refinement module 61 checks if a pre-defined accuracy threshold needs to be met by the refined sub-model, for example a two pixel accuracy. It will be appreciated that applying an accuracy threshold is optional. If the accuracy is not within the pre-defined threshold, then processing proceeds to step S17-23 where the refinement module 61 determines if the percentage of eigenvector weights is under a second pre-defined limit b in sub-model parameters. If not, the refinement process is terminated and processing proceeds to step S15-11 discussed below. On the other hand, if it is determined at S17-21 that the pre-defined accuracy threshold needs to be met, then at step S17-25, the refinement module 61 performs processing to refine the corresponding sub-shape appearance and combined models 35, 39. For example, the sub-shape appearance model 35 can be refined using known AAM techniques. At step S17-27, the refinement module 61 converts the refined sub-shapes 29 back to the original image from the reference image coordinate frame, and brings together the respective separate data structures for the previously split candidate sub-shapes, back into a global shape framework. FIG. 18*e* shows an example of the further refined global object shape 71*a* displayed over the captured image data 73, as a result of the refinement of the object sub-shapes 75, which is more efficient and accurate than carrying out further refinement of the global object shape 71.

After the object refinement process is completed, processing proceeds to step S15-10 in FIG. 15, where the tracking module 11 determines whether refinement of the detected object sub-shapes within the acceptable parameters was successfully achieved at step S15-9. If not, for example if it was determined at step S17-3 or step S17-23 that tracking of the object was lost, then processing can return to step S15-1, where a new captured image is received from the camera for processing in a new iteration by the tracking module 11.

Otherwise, if the tracking module 11 determines that acceptable sub-shape refinement was achieved by the processing at step S15-9, then at step S15-11, the tracking module 11 optionally applies an exponential smoothing process to the object shape, based on the object shape detected on the previous frame when available. Exponential smoothing can be carried out on the estimated object shape data in order to produce smoothed data for presentation purposes, based on the following exemplary equation:

$$s_t = \alpha x_t + (1-\alpha) s_{t-1}$$

where st−1 is the previous object shape determined from the previous frame, st is the smoothed version of the current estimated object shape xt, and α is a weighting value which is adapted automatically during runtime. It will be appreciated that this smoothing technique advantageously provides for improved visualisation of the estimated shape(s), therefore forecasts need not be obtained to make predictions of where the object might be in the next frame. The complex environments where the invention aims to operate includes unknown lighting conditions, movements of both the camera and the object to track occasioning very complicated motion models and no ground truth of the real position or measurement to be used in the update step in more complicated strategies for tracking such as Kalman filtering.

In this way, a robust, accurate and efficient technique for locating and tracking sub-aspects, such as facial features of a global detected object, such as a subject's face, is provided. A number of advantages will be understood from the above description of the embodiments of the present invention. In particular, the tracking technique is efficient and robust to more generalized object models, by obtaining an initial rough estimate of a candidate global shape using the trained global shape model, and subsequently refining the respective candidate sub-shapes of the candidate global shape by applying the corresponding sub-shape regression coefficient matrices to obtain the displacements which leads to accurate positions of the object features to track. Therefore, the global shape model and corresponding regression coefficient matrix is applied only once to the image data, and each subsequent iteration of the refinement sub-process involves a significantly lesser amount of data, due to the provision of sub-shape models defined by subsets of feature points of the global shape and computation using the corresponding reduced size regression coefficient matrices, making the technique suitable to be used for real-time applications, particularly in computing devices with reduced hardware capabilities, such as limited memory and/or processor resources.

Colourisation and Augmentation

Figure 19:
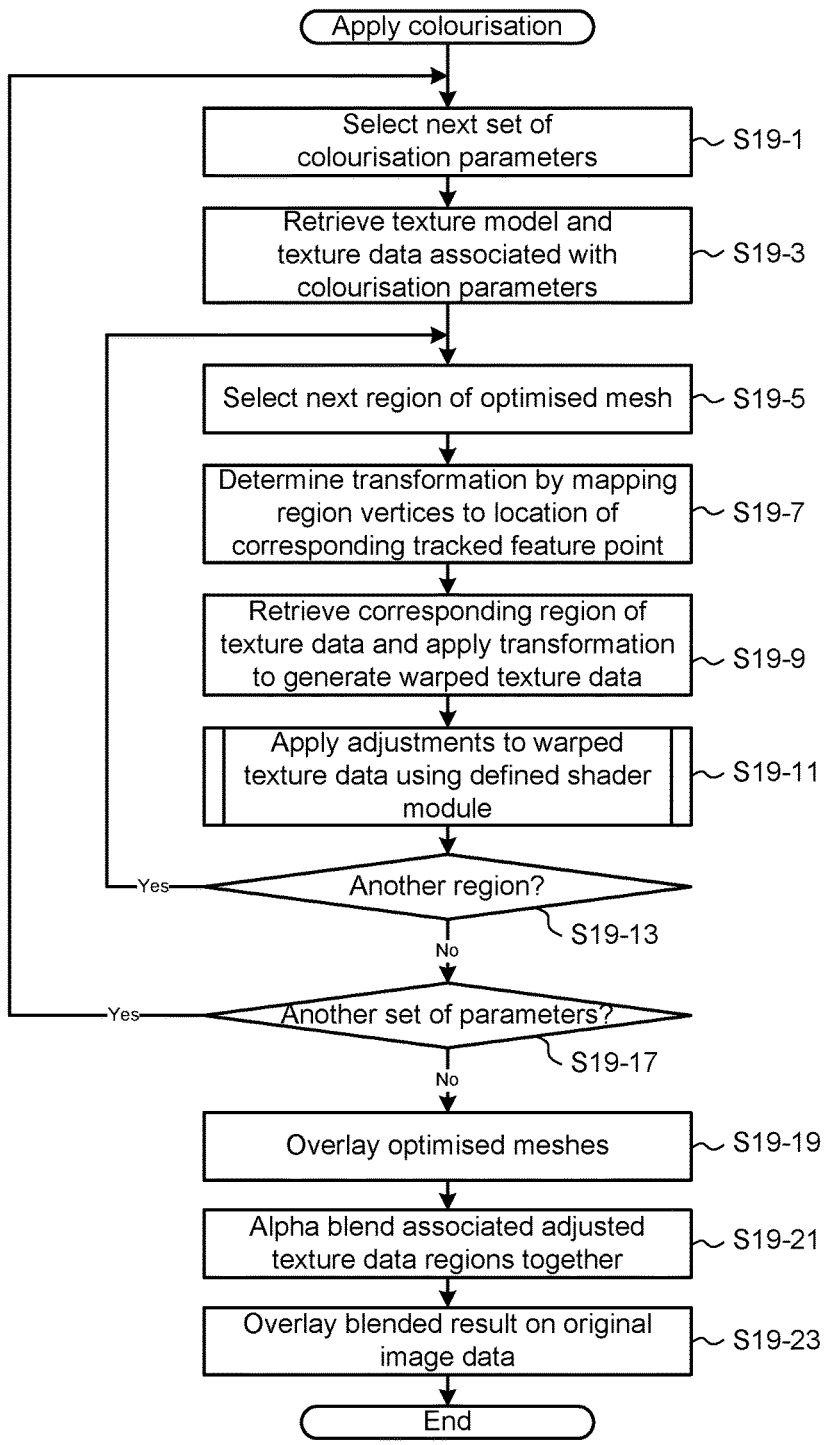
FIG. 19 is a flow diagram illustrating the main processing steps performed by the colourisation module of FIGS. 1 and 2 to apply colourisation to image data according to an embodiment.
Figure 20:
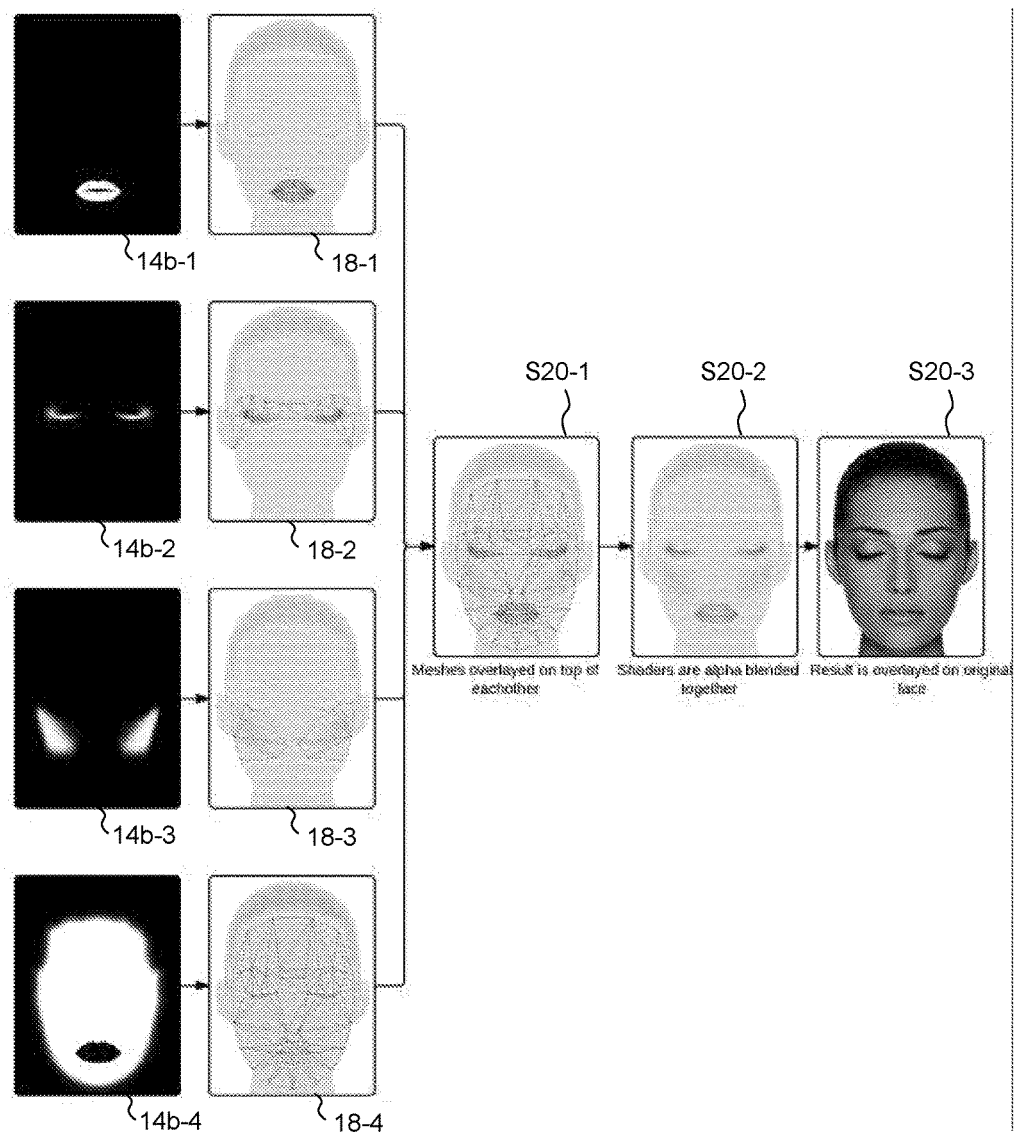
FIG. 20 shows examples of data that is processed by, and processing steps performed by the colourisation module during the colourisation process of FIG. 19.

The colourisation process performed by the colourisation module 13 in the system 1 will now be described in more detail with reference to FIG. 19, which shows the steps of an example computer-implemented colourisation process in another embodiment of the present invention. Reference is also made to FIG. 20, showing examples of data that is processed by, and processing steps performed by the colourisation module during the colourisation process. As shown in FIG. 19, at step S19-1, the colourisation module 13 selects a first set of colourisation parameters 26 from the colourisation parameters database 28. At step S19-3, the colourisation module 13 retrieves the texture model 16 and the texture data file 19 associated with the selected set of colourisation parameters 26.

In the illustrated example of FIG. 20, four texture models 16 are retrieved from the object model database 10, each with a respective different mask 14b and optimised mesh 18. Each retrieved texture model 16 is selected based on a corresponding set of colourisation parameters 26. A first mask 14b-1 defines a masked lip region of the reference image 8 and is associated with a first optimised mesh 18-1 defining polygonal areas around the masked lip region. A second mask 14b-1 defines two masked eye regions of the reference image and is associated with a second optimised mesh 14b-2 defining polygonal areas around the masked eye regions. A third mask 14c-1 defines two masked cheek regions of the reference image 8 and is associated with a third optimised mesh 18-3 defining polygonal areas around the cheek regions. A fourth mask 14b-4 defines a masked skin region of the reference image and is associated with a fourth optimised mesh 14b-4 defining polygonal areas of the masked skin region.

At step S19-5, the colourisation module 13 selects a first region of the optimised mesh 18 from the retrieved texture model 16. At step S19-7, the transform module 20 determines a set of transformation values by mapping the coordinates of the vertices of the selected region to the location of the corresponding tracked feature point determined by the tracking module 11. At step S19-9, the transform module 20 retrieves the corresponding region of texture data 19, again as referenced by the vertices of the selected region, and applies the transformation to the retrieved region of texture data to generate a corresponding warped texture data region. Optionally, the transform module 20 may also retrieve the corresponding region of mask data 14b, as defined by the vertices of the selected region, and apply the transformation to the retrieved masked data to generate corresponding warped masked data for the selected region. At step S19-11, the colourisation module 13 applies one or more image colourisation adjustments to the warped texture data region using the shader module 22 as defined by the shader value parameter 26-3. As will be described below, the shader modules 22 may optionally take into account the warped mask data region, depending on the particular shader sub-modules that are used.

At step S19-13, the colourisation module 13 determines if there is another region of the optimised mesh 10 to be processed, and if so, processing returns to step S19-5 where the next region is selected for processing as discussed above, until all of the regions of the optimised mesh 18 have been processed in this way. At step S19-17, the colourisation module 13 then determines if there is another set of colourisation parameters 26 to be processed for the current captured image frame. If so, processing returns to step S19-1 where the next set of colourisation parameters 26 is selected and processed as discussed above, until all of the sets of colourisation parameters 26 have been processed in this way.

Figure 21:
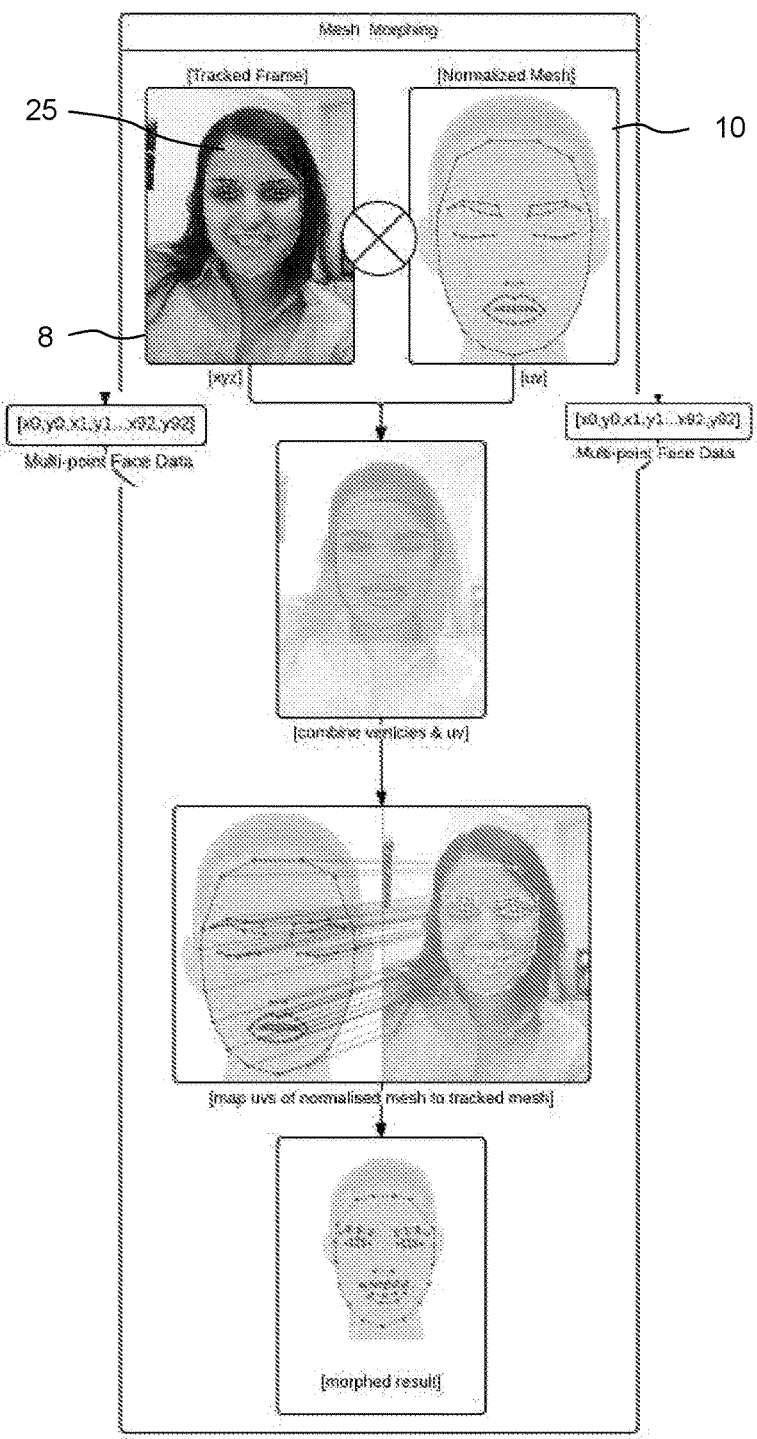
FIG. 21 schematically illustrates an exemplary sequence of data that may be processed by, and processing steps performed by, the transform module to determine transformation of mesh data.

At step S19-19, the renderer 24 retrieves and overlays all of the optimised meshes 18 as a sequence of layered data to be applied to the captured image data. This is schematically illustrated at S20-1 in FIG. 21. At step S19-21, the renderer 24 performs an alpha blend of the adjusted texture data regions associated with each of the layered optimised meshes 18, as output by the respective shader modules 22. FIG. 21 shows an example of the blended result at S20-2. The renderer 24 then overlays the blended results on the original captured image data for output to the display 15, at step S19-23. FIG. 21 shows an example of the resulting augmented image data at S20-3.

It will be appreciated that this is just one exemplary sequence of processing steps to retrieve the respective regions of texture data 19 defined by image coordinates corresponding to the vertices of the masked regions defined by the optimised mesh 18. As one alternative, the colourisation module 13 may be configured to determine a set of transformation values by mapping all of the vertices of the normalised mesh 10 as a whole to the respective corresponding labelled feature points of the tracking data, whereby the determined transformation values can be applied to each region of texture data and mask data as discussed above. FIG. 20 schematically illustrates an exemplary sequence of data that may be processed by, and processing steps performed by, the transform module 20 to determine transformation of mesh data. In the illustrated example, the reference image 8 and detected tracking feature point data 25 can be combined with the normalised mesh 10, to produce a single mesh including the coordinates of the vertices from the tracked data 25 and the coordinates of the vertices from the normalised mesh 10. The vertices from the normalised mesh 10 are mapped to the vertices of the tracked data 25, to determine respective transformation values based on the respective coordinates for each corresponding pair of vertices, for example in terms of translation in the two-dimensional plane. The resulting transformation values can be illustrated as a morphed result, which can be subsequently applied to at least a portion of a mask data 14b and texture data 19, as described above.

The resulting augmented image with the applied texture and colourisation is output at step S12-15 for example on display 15. At step S12-17, the tracking module 11 determines if there is a new captured image frame to process when processing returns to step S12-3 to continue tracking of the object from the last/previous frame, from step S12-9 onwards.

Shader Modules

Figure 22B:
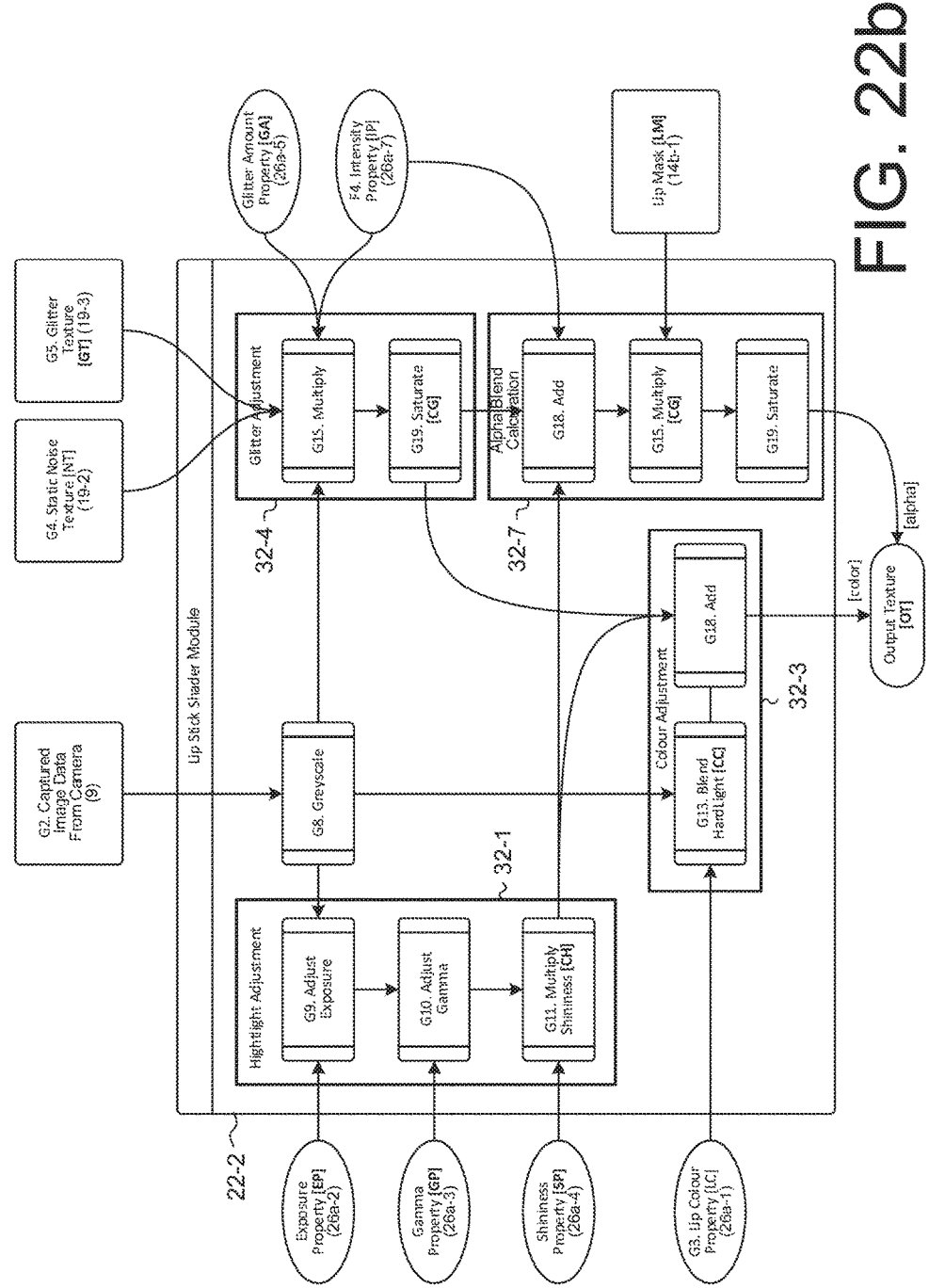
Figure 22C:
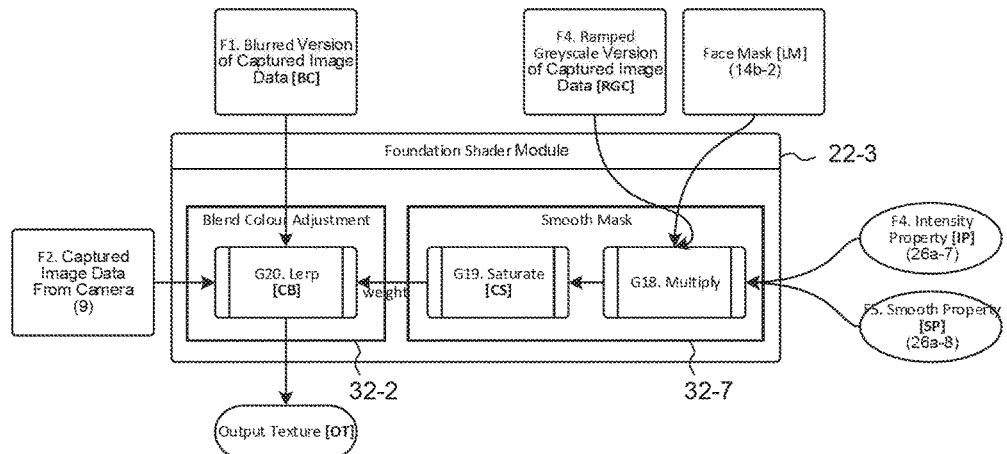
Figure 22D:
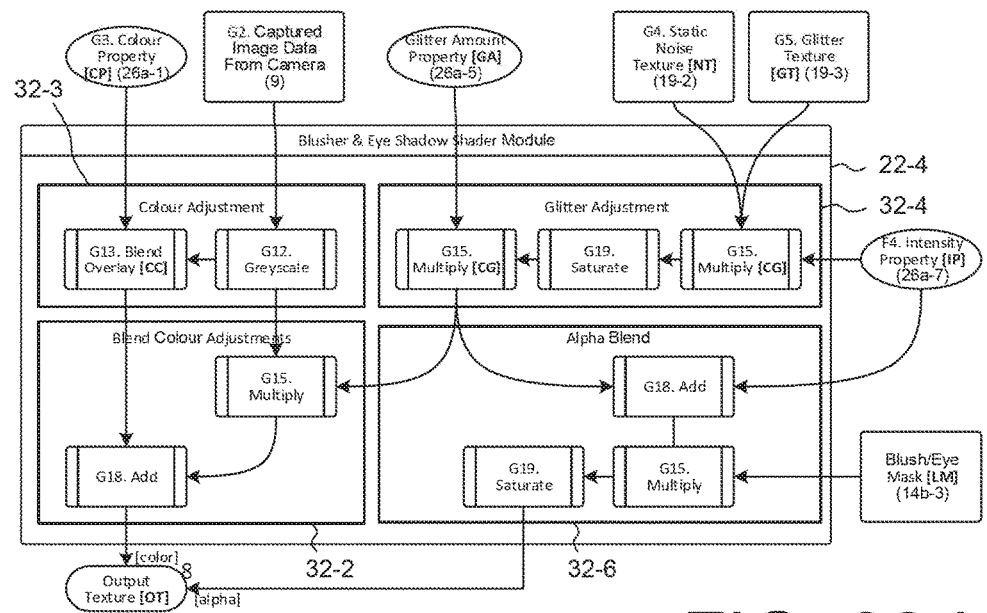

FIG. 22, which comprises FIGS. 22a to 22d, schematically illustrate exemplary shader modules 22 and respective processes for applying colourising adjustments, as set out in step S18-13 above, to identified portion(s) of associated texture data. Each shader module 22 is defined by a predetermined set of shader sub-modules 32 for performing respective adjustments to the texture image data and/or captured image data, optionally taking into account properties 26-1 of the present set of colourisation parameters 26.

Figure 7D:
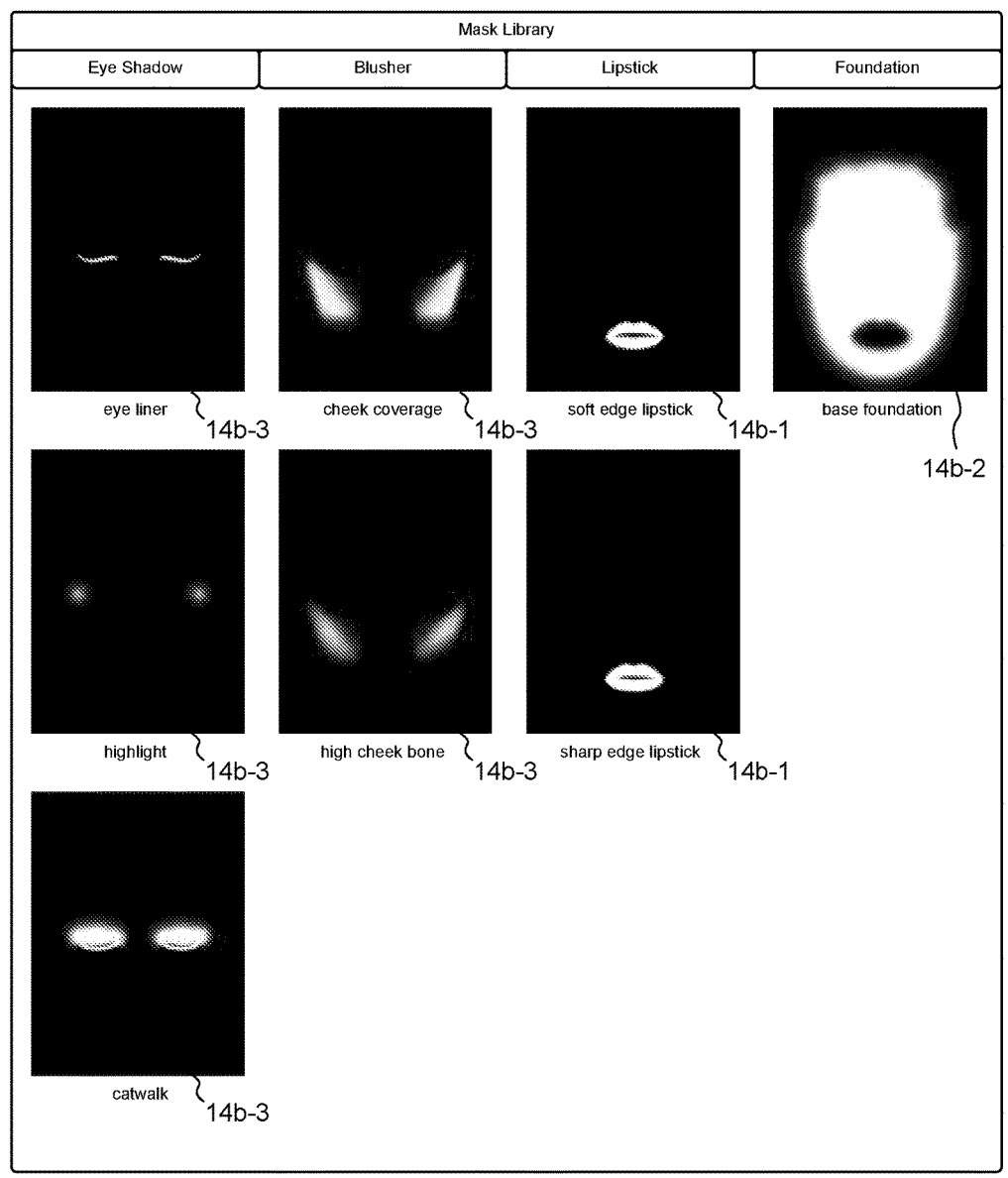
FIG. 7, which comprises FIGS. 7a to 7d, schematically illustrate further examples of data processed and generated by the texture model training module during the training process.

FIG. 22a illustrates a first example of a lip shader module 22-1 for applying colourisation to a portion of the captured image data based on a corresponding portion of a lipstick detail texture 20-1. In this example, a lip mask 14b-1 defines the masked portion as the lips of a face in the captured image data, for example as shown in FIG. 7d. At a step G1, the warped region of the lipstick detail texture data file 19-1 is provided. This is a predetermined lip image 20-1 warped into the shape of the detected object in the captured image frame, and carrying a texture such as glossy or matte. At step G2, the captured image data from the camera 9 is provided, in which the user's face will typically be visible. At step G7, a highlight adjustment shader sub-module 32-1 uses the lipstick detail texture 20-1 and captured image data to perform a blend operation in a highlight adjustment stage. This blend operation serves to average (per pixel) the luminance of the lipstick detail texture and captured image data. This adds additional detail to the captured image data which may in some cases show quite featureless lips. For example, the operation can be applied on a per channel basis for the input pixels a, b, across the red, blue and green channels, as follows:

$$a \in [r, g, b], b \in [r, g, b]$$

$$f_{softlight}(a, b) = \begin{cases} 2ab + a^2(1 - 2b), & \text{if } b < 0.5 \\ 2a(1 - b) + \sqrt{a(2b - 1)}, & \text{otherwise} \end{cases}$$

This is followed by a greyscale conversion step G8 to convert the combined output of the captured image data and lipstick detail texture 20-1 (output of step G7) into greyscale. For example, this can be calculated as a weighted sum of the colour channels, with weights set to best match the human perception of colour, as follows:

$$f_{greyscale}(r,g,b) = 0.2125 \cdot r + 0.7154 \cdot g + 0.0721 \cdot b$$

Then, the exposure of the output of the step G8 is adjusted at a step G9, based on an exposure property 26a-2, to influence the brightness level at which highlight features would be added to the lip texture, and has the effect of nonlinearly increasing or decreasing the input value. For example, exposure can be computed as:

$$f_{exposure}(x,n) = x \cdot 2^n$$

As discussed above, the various properties taken into account by the shader sub-modules in this process can be defined by the present selected set of colourisation parameters 26.

Similarly, at a step G10 the gamma of the greyscale image is adjusted, using a gamma property 26a-3, for the same reasons as the step G9. The result of G9 and G10 may be a pixel value which has either been emphasised (brightened) or diminished (reduced in brightness). G10 has the effect of nonlinearly adjusting the greys of an image either boosting or diminishing their output value without adjusting either complete white or complete black as follows:

$$f_{gamma}(x, g) = x^{\frac{2}{g}}$$

A multiply shininess step G11 then modifies the shininess of the greyscale image/texture based on a shininess property 26a-4. In other words, the step G11 linearly modulates the pixel value to inhibit harsh lighting effects. The resulting output of the highlight adjustment stage is passed to a first step of a blend colour adjustments stage. The purpose of the steps G9 to G11 is to emphasise existing areas of brightness in the final augmented lip texture. The resulting output of the highlight adjustment sub-module 32-1 is passed to a first processing step of a blend colour adjustment shader sub-module 32-2.

At a step G12, a lip colour adjustment shader sub-module 32-3 performs a greyscale operation on the captured image data as a first step to convert incoming pixel colour values into greyscale. Then, at a step G13 the greyscale image is blended with a lip colour property 26a-1 (selected lip colour property—from a step G3) to form an overlay. The resulting output of the lip colour adjustment sub-module 32-3 is also passed to the blend colour adjustment shader sub-module 32-2.

$$a \in [r, g, b], b \in [r, g, b]$$

$$f_{overlay}(a, b) = \begin{cases} 2ab, & \text{if } a < 0.5 \\ 1 - 2(1 - a(1 - b)), & \text{otherwise} \end{cases}$$

Meanwhile, at a step G4 a static noise texture, such as a simple Gaussian noise, is provided as a 2D image. A glitter texture is provided at a step G5 (Gaussian noise, and again a 2D image, but in this case warped to the shape of the lips/model). Optionally, an appearance model texture may be provided as input for further colour adjustment, for example to a Gaussian blur at a first step G14 of a glitter adjustment shader sub-module 32-4 to soften the edges of the lip model texture. The blurred model, and the static and warped textures may be passed to a multiply step G15 in combination with a glitter amount property 26a-5. The textures are multiplied together (weighted by the glitter amount property 26a-5) so that the pixel values (greyscale) of spatially correlated pixels with the respective 2D images are multiplied together. When the lips (and the model) move, the warped texture will move with respect to the static texture, causing a sparkling effect on the lips. The resulting output of the glitter adjustment sub-module 32-4 is also passed to the blend colour adjustment shader sub-module 32-3.

At a step G18, the outputs of the steps G11, G13 and G15 are added together in the first step of the blend colour adjustment shader sub-module 32-2. At a step G16, a lighting model adjustment sub-module computes a lighting model adjustment by linearly interpolating the blurred appearance model texture based on a 50% grey level set at a step G17 and a lighting property 26a-6 (which controls how much influence is provided by the output of the appearance model, and how much influence is provided by the fixed grey level). The overlay generated at the step G18 is then blended with the lighting model by the blend colour adjustment sub-module 32-2, at a step G19. The purpose of the lighting model adjustment is to emphasise the detail taken from the appearance model texture, while controlling the level of influence this has (using the lighting property 26a-6 and G17 grey level) so as not to produce harsh, dominating effects. The output of the step G19 is then further linearly interpolated based on alpha value of the lip colour property 26a-1 (to control the balance between the original input image and the augmented overlay) and the captured image at a step G20.

$$f_{lerp}(a,b,w) = a + w(b-a)$$

At a step G21, an alpha blend adjustment sub-module 32-6 applies a Gaussian blur operation to soften the edges of the lip mask data 14b-1 (defining which parts of an image are lip and which are not) at step G21, and then at a step G22 is used to perform an alpha blend stage with the adjusted overlay, received from the blend colour adjustment sub-module 32-2, and the captured image data.

$$f_{alphablend}(a,b,w) = (a \cdot w) + b \cdot (1-w)$$

Advantageously, this prevents the colourisation from being applied outside the lip region of the input image, and softens the colourisation at the boundary of the lips. In summary, the overall computed highlight intensity calculated by this exemplary lip shader module 22-1 is as follows:

Highlight Adjustment $$CH = \text{Gamma}(\text{Exposure}(\text{Greyscale}(\text{BlendSoftLight}(WC,LD))),EP),GP)*SP$$

where CH is the computed highlight intensity, WC is the captured image pixel colour, LD is the Lipstick Detail Texture pixel colour, EP is the Exposure Property 25a-2, GP is the Gamma Property 26a-3, and SP is the Shininess Property 26a-4.

Lip Colour Adjustment $$CC = \text{Overlay}(LC, \text{Greyscale}(WC))$$

where CC is the computed lip colour, and LC is the Lip Colour Property 26a-1.

Glitter Adjustment:

$$CG = GT * NT * \text{Guassian}(AM) * GA$$

where CG is the computed glitter intensity, NT is the Static Noise Texture pixel colour, GT is the Glitter Texture pixel colour, AM is the Appearance Model pixel colour, and GA is the Glitter Amount Property 26a-5.

Lighting Model Adjustment $$CL = \text{Lerp}(0.5, AM, LP)$$

where CL is the computed lighting model intensity, and LP is the Lighting Property 26a-6.

Blend Colour Adjustments $$BC = \text{Lerp}(WC, \text{Overlay}(CC + CH + CG, CL))$$

where BC is the blended colours adjustments.

Alpha Blend Adjustment $$OT = \text{AlphaBlend}(BC, WC \text{ Guassian}(LM))$$

where OT is the 'Output Texture' pixel colour, and LM is the 'Lip Mask Texture' pixel colour.

FIG. 22b illustrates a second example of a lip shader module 22-2 for applying colourisation to a portion of the captured image data, based on a corresponding portion of a lipstick detail texture 20-1. As in the first example, the lip mask 14b-1 defines the masked portion as the lips of a face in the captured image data. However, in this example, the lip stick shader module 22-2 is configured to use a different set of shader sub-modules 32 than the first example above. Additionally, instead of applying the alpha blend to the captured and adjusted image data, an adjusted colour value for each pixel is output as the resulting colourised texture data along with a corresponding calculated alpha value for each pixel. Accordingly, as shown in FIG. 22b, an alpha blend calculation sub-module 32-7 calculates the respective alpha blend values for the output texture portion by first receiving output data from a highlight adjustment sub-module 32-1 and a glitter adjustment sub-module 32-4, and adding the received data together at a step G18 based on an intensity property 26a-7. The output of step G18 is then additively multiplied with data of the warped portion of the lip mask 14b-1 at step G15, and further processed in a subsequent saturation step G19. The intensity property 26a-7 is also used by the glitter adjustment sub-module 32-4 as a further parameter to control the glitter adjustment.

A colour adjustment sub-module 32-3 is used to apply the lip colour property 26a-1 to a greyscale version of the portion of the captured image data to determine the colour values for the output texture. In this example, the colour adjustment sub-module 32-3 is configured to apply a "hard light" blend at a modified step G13, to combine the lip colour property 26a-1 with the greyscale captured image data. For example, the operation can apply the property b to each input pixel a as follows:

$$f_{hard\ light}(a,b) = \begin{cases} 2ab, & \text{if } b < 0.5 \\ 1 - 2(1-a)(1-b), & \text{otherwise} \end{cases}$$

FIG. 22c illustrates an example of a foundation shader module 22-3 for applying colourisation to another portion of the captured image data, based on a corresponding warped portion of a face mask 14b-2. In this example, the face mask 14b-2 defines the masked portion as the skin portion of a face in the captured image data, for example as shown in FIG. 7d. As shown in FIG. 22c, a blend colour adjustment sub-module 32-2 linearly interpolates the captured image data from the camera 9 with a blurred version of the captured image data, based on the weighted output of a smooth mask sub-module 32-7. The smooth mask sub-module 32-7 performs processing at a step G18 to add the face mask data 14b-2 with a ramped greyscale version of the captured image data, based on an intensity property 26a-7 and a smooth property 26a-8, and adjusts the saturation of the output at a step G19.

Figure 23:
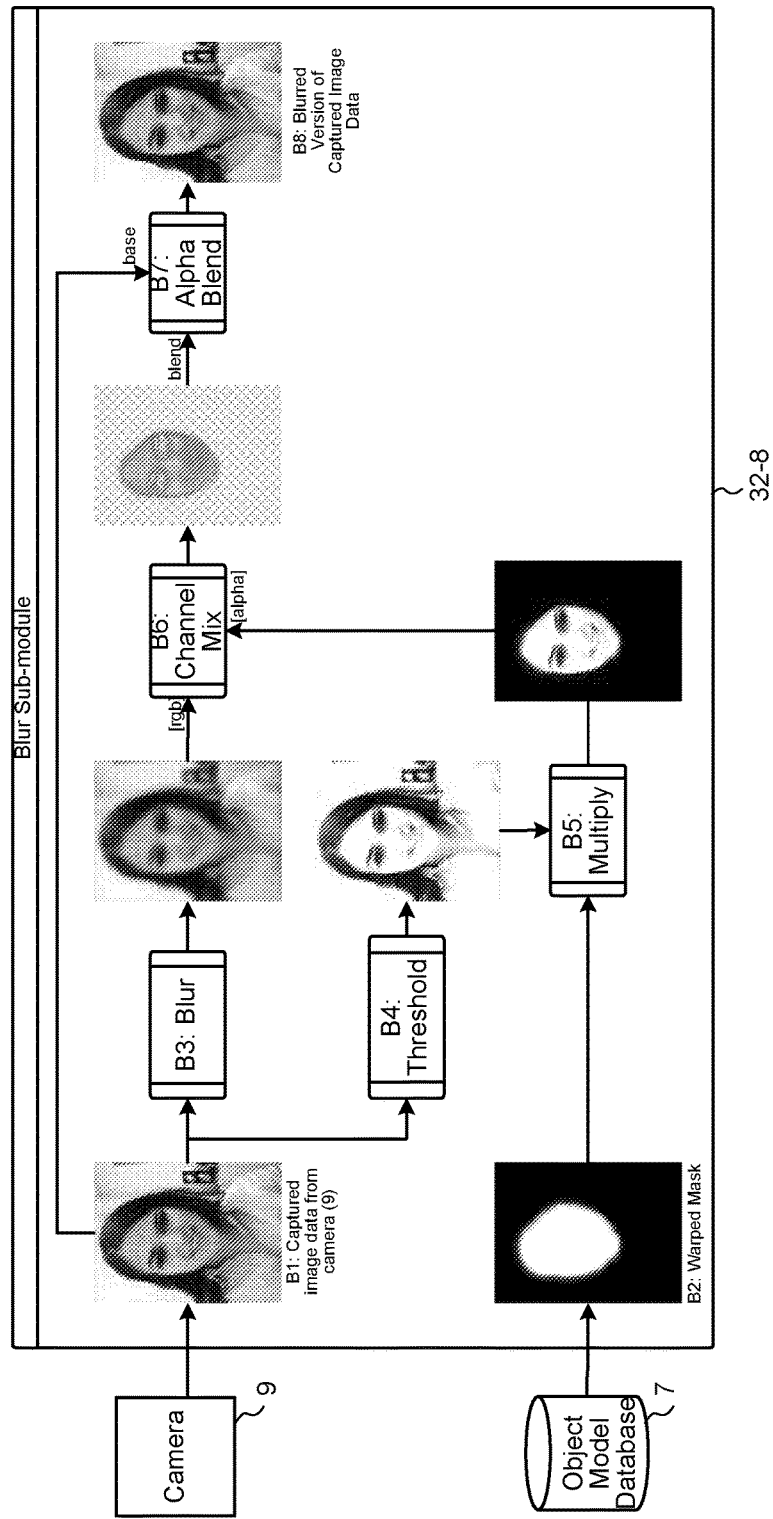
FIG. 23 schematically illustrates an example process for generating a blurred version of the captured image data.

FIG. 23 schematically illustrates an example process for generating a blurred version of the captured image data, which is particularly optimal in the context of applying virtual foundation make-up in a tracking and augmenting system 1. As shown in FIG. 23, a blurring sub-module 32-8 receives the captured image data from the camera 9. At a step B3, the captured image data is blurred by downsampling the input image data to a lower resolution. At a step B4, a threshold function is applied to the pixel values of the captured image data, for example by a function:

$$f(x) = \text{Greyscale}(x)^{2.5} * 5.0$$

At a step B5, the thresholded image data is multiplied by the face mask 14b-2, retrieved from the object model database 7, to discard pixels outside the masked face region. At a step B6, the blurred image data is mixed with the result of step B5, resulting in the discarding of pixels outside the masked face region and discarding of dark features from the input captured image data. At a step B7, the result of step B6 is alpha blended with the original captured image data. Advantageously, the blurring sub-module 32-8 outputs a resulting image with softened facial features, while maintaining sharp facial features. Although the blurring process in FIG. 23 is described as applied to the entire image as captured by the camera 9, it is appreciated that the blurring process can be applied to just the masked region of the captured image data for improved efficiencies.

FIG. 22d illustrates an example of a blusher and eye shadow shader module 22-4 for applying colourisation to yet other portions of the captured image data, based on a corresponding portion of a blusher or eye mask 14b-3. In this example, the blusher or eye mask 14b-3 defines the masked portion as the cheek or eye portions of a face in the captured image data, for example as shown in FIG. 7d. As shown in FIG. 22d, the colour values of the output texture portion are calculated by applying adjustments to the corresponding portion of the captured image data using the colour adjustment sub-module 32-3 and the blend dour adjustment module 32-2, similarly to the examples discussed above. The alpha blend calculation sub-module 32-7 calculates the corresponding alpha values for the output texture portion, based on the received output from the glitter adjustment sub-module 32-4, an intensity property 26a-7, and the warped region of the blush or eye mask data 14b-3, in a similar manner as the examples discussed above.

Computer Systems

Figure 24:
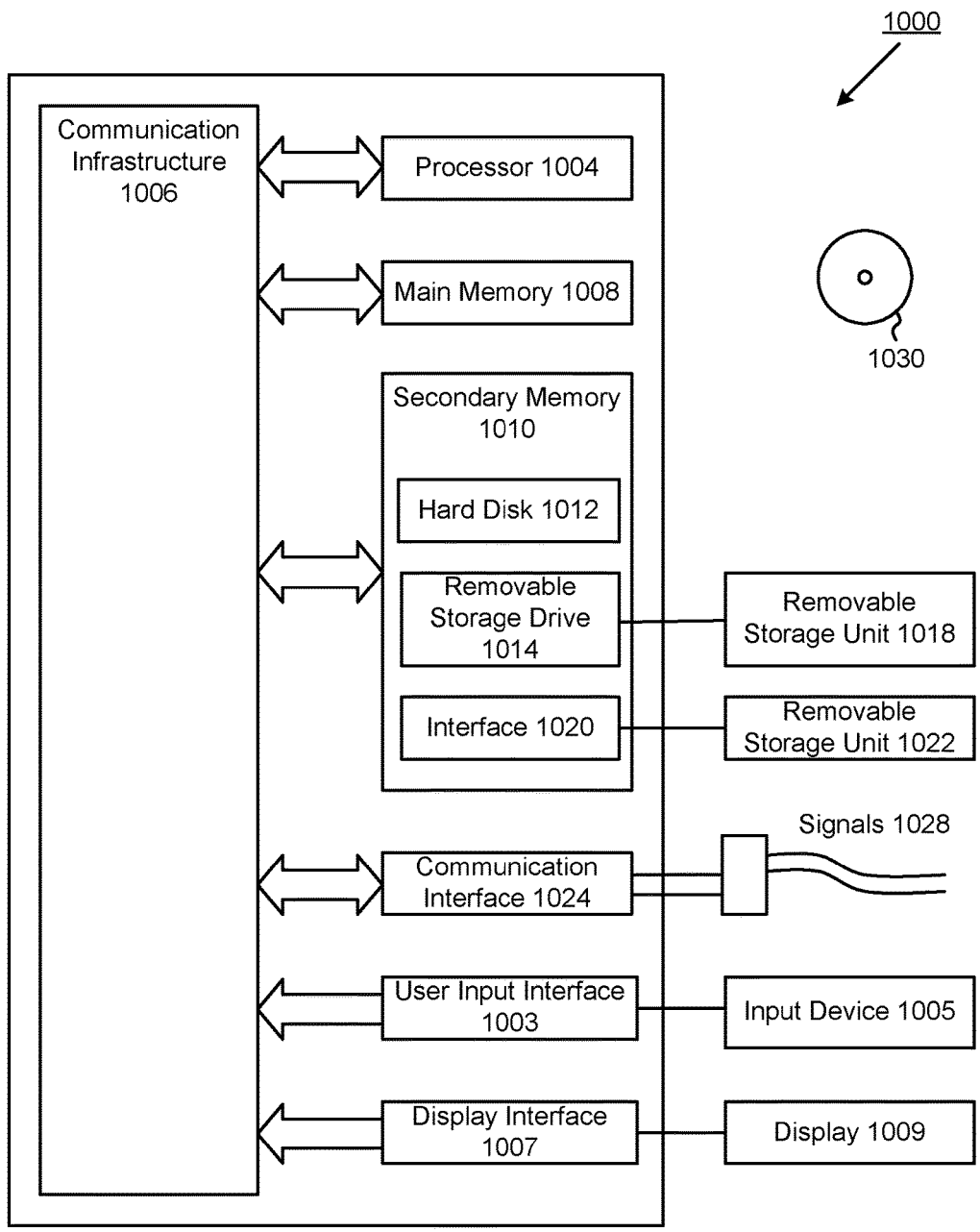
FIG. 24 is a diagram of an example of a computer system on which one or more of the functions of the embodiment may be implemented.

The modules described herein, such as the training, tracking and colourisation modules, may be implemented by a computer system or systems, such as computer system 1000 as shown in FIG. 24. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention. Further alternative embodiments may be envisaged, which nevertheless fall within the scope of the following claims.

The invention claimed is:

1. A computer-implemented method of generating at least one augmentation representation based on respective predefined mask data identifying coordinates of a plurality of masked pixels, the method comprising the computer-implemented steps of:
   receiving data of an image captured by a camera;
   receiving data identifying coordinates of a plurality of labelled feature points defining a detected object in the captured image;
   generating at least one augmentation representation based on respective predefined mask data identifying coordinates of a plurality of masked pixels, by:
   retrieving data defining a plurality of polygonal regions of augmentation image data determined for the detected object, wherein the augmentation image data defines a plurality of augmentation values to be applied to the captured image data, and wherein each polygonal region is defined by three or more vertices, each vertex of the three or more vertices being associated with a corresponding labelled feature point;
   placing the retrieved plurality of polygonal regions over the respective mask data;
   identifying polygonal regions that include at least one masked pixel; and
   storing data representing the identified subset of polygonal regions.

2. The method of claim 1, further comprising:
   determining a transformation of the at least one polygonal region of the representation based on the received coordinates of the corresponding feature points;
   applying the determined transformation to corresponding regions of the augmentation image data defined by the at least one polygonal regions of the augmentation representation; and
   augmenting the captured image data by applying the transformed at least one portion of the augmentation image data to the corresponding portion of the captured image data.

3. The method of claim 2, wherein the augmentation image data comprises one or more of texture image data, data identifying one or more material properties, and a mathematical model to generate an array of augmentation values.

4. The method of claim 2, wherein the augmentation image data and the captured image data have the same dimensions.

5. The method of claim 2, wherein the augmentation image data and the captured image data have different dimensions.

6. The method of claim 2, wherein coordinates of the vertices of the augmentation representation are defined relative to pixel locations of the augmentation image data.

7. The method of claim 2, wherein augmenting the captured image data further comprises applying at least one image data adjustment to the transformed at least one portion of the augmentation image data.

8. The method of claim 7, wherein the at least one image data adjustment comprises one or more of a highlight adjustment, a colour adjustment, a glitter adjustment, a lighting model adjustment, a blend colour adjustment, and an alpha blend adjustment.

9. The method of claim 7, wherein the at least one image data adjustment comprises alpha blending said transformed masked data regions.

10. The method of claim 2, further comprising selecting a stored augmentation image data and a stored augmentation representation based on at least one colourisation parameter.

11. The method of claim 10, wherein a plurality of stored augmentation image data and stored augmentation representations are selected based on respective at least one colourisation parameters.

12. The method of claim 11, wherein augmenting the captured image data comprises alpha blending the results of applying, for each selected augmentation representation in sequence, transformed at least one portions of each selected augmentation image data to the corresponding portion of the captured image data, and applying the alpha blended output to the captured image data.

13. The method of claim 1, wherein each masked pixel comprises a value representing a blend parameter.

14. The method of claim 1, further comprising locating the detected object in the captured image by:
   storing a representation of the object, the representation including data defining a first object model and a corresponding function that approximates variations to the first object model, and data defining at least one second object model comprising a subset of the data defining the first object model, and at least one corresponding function that approximates variations to the respective second object model;
   determining an approximate location of the object in the captured image, based on the first object model and its corresponding function; and
   refining the location of the object in the captured image by determining a location of a portion of the object, based on the at least one second object model and its corresponding function.

15. The method of claim 14, wherein the first object model comprises data representing locations of a plurality of feature points and the second object model comprises a subset of the feature points of the first object model.

16. The method of claim 14, wherein the first object model defines a shape of the whole object and the at least one second object model defines a shape of a portion of the object.

17. The method of claim 14, wherein determining the approximate location of the object in the image comprises generating a candidate object shape based on the first object model and applying the corresponding function to determine an approximate location of the candidate object shape.

18. The method of claim 17, further comprising splitting the candidate object into one or more candidate object sub-shapes based on the at least one second object models.

19. The method of claim 18, further comprising refining the location of the one or more candidate object sub-shapes based on the respective second object model and its corresponding function.

20. The method of claim 14, wherein the corresponding functions comprise regression coefficient matrices.

21. The method of claim 20, wherein the corresponding function that approximates variations to the second object model comprises a plurality of cascading regression coefficient matrices.

22. The method of claim 21, further comprising iteratively refining the location of the one or more candidate object sub-shapes based on the respective second object model and its corresponding plurality of cascading regression coefficient matrices.

23. A system comprising one or more processors configured to perform the method of:
receiving data of an image captured by a camera;
receiving data identifying coordinates of a plurality of labelled feature points defining a detected object in the captured image; and
generating at least one augmentation representation based on respective predefined mask data identifying coordinates of a plurality of masked pixels, by:
retrieving data defining a plurality of polygonal regions of augmentation image data determined for the detected object, wherein the augmentation image data defines a plurality of augmentation values to be applied to the captured image data, and wherein each polygonal region is defined by three or more of vertices, each vertex associated with a corresponding labelled feature point;
placing the retrieved plurality of polygonal regions over the respective mask data;
identifying polygonal regions that include at least one masked pixel; and
storing data representing the identified subset of polygonal regions.

24. A non-transitory computer-readable medium comprising computer-executable instructions, that when executed perform the method of:
receiving data of an image captured by a camera;
receiving data identifying coordinates of a plurality of labelled feature points defining a detected object in the captured image; and
generating at least one augmentation representation based on respective predefined mask data identifying coordinates of a plurality of masked pixels, by:
retrieving data defining a plurality of polygonal regions of augmentation image data determined for the detected object, wherein the augmentation image data defines a plurality of augmentation values to be applied to the captured image data, and wherein each polygonal region is defined by three or more of vertices, each vertex associated with a corresponding labelled feature point;
placing the retrieved plurality of polygonal regions over the respective mask data;
identifying polygonal regions that include at least one masked pixel; and
storing data representing the identified subset of polygonal regions.

* * * * *